(12) United States Patent
Shinde

(10) Patent No.: US 6,775,331 B1
(45) Date of Patent: Aug. 10, 2004

(54) TRANSMISSION BAND LIMITING FILTER APPARATUS AND TRANSMISSION APPARATUS

(75) Inventor: Hiroki Shinde, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 687 days.

(21) Appl. No.: 09/660,656

(22) Filed: Sep. 13, 2000

(30) Foreign Application Priority Data

Sep. 14, 1999 (JP) .................................... Hei. 11-260618

(51) Int. Cl.⁷ .................... H04L 25/49; H04L 27/20; H04B 1/707
(52) U.S. Cl. .................. 375/297; 375/140; 375/308; 370/208
(58) Field of Search ............... 375/140, 141, 375/146, 279, 281, 284, 296, 297, 308; 370/208

(56) References Cited

U.S. PATENT DOCUMENTS 5,751,705 A    5/1998  Sato
5,822,323 A   10/1998  Kaneko et al.
5,978,421 A * 11/1999  Shoji ........................ 375/297

FOREIGN PATENT DOCUMENTS

| EP | 1 085 670 A2 | * 3/2001 |
| JP | 8-340361 | 12/1996 |
| JP | 9-149090 | 6/1997 |
| JP | 10-178411 | 6/1998 |

* cited by examiner

Primary Examiner—Young T. Tse
(74) Attorney, Agent, or Firm—Pearne & Gordon LLP

(57) ABSTRACT

A transmission system is featured by that a correcting unit is arranged at a prestage of an ROF unit in the CDMA system. In this transmission system, an instantaneous power amount is calculated, and is compared with a preset upper limit value. When this calculated instantaneous power amount exceeds this upper limit value, this power amount is detected as an instantaneous peak. Only when the calculated instantaneous power amount exceeds the upper limit value, an amplitude correction is selectively carried out so as to reduce distortions appeared in the vicinity of a region to be corrected.

12 Claims, 16 Drawing Sheets

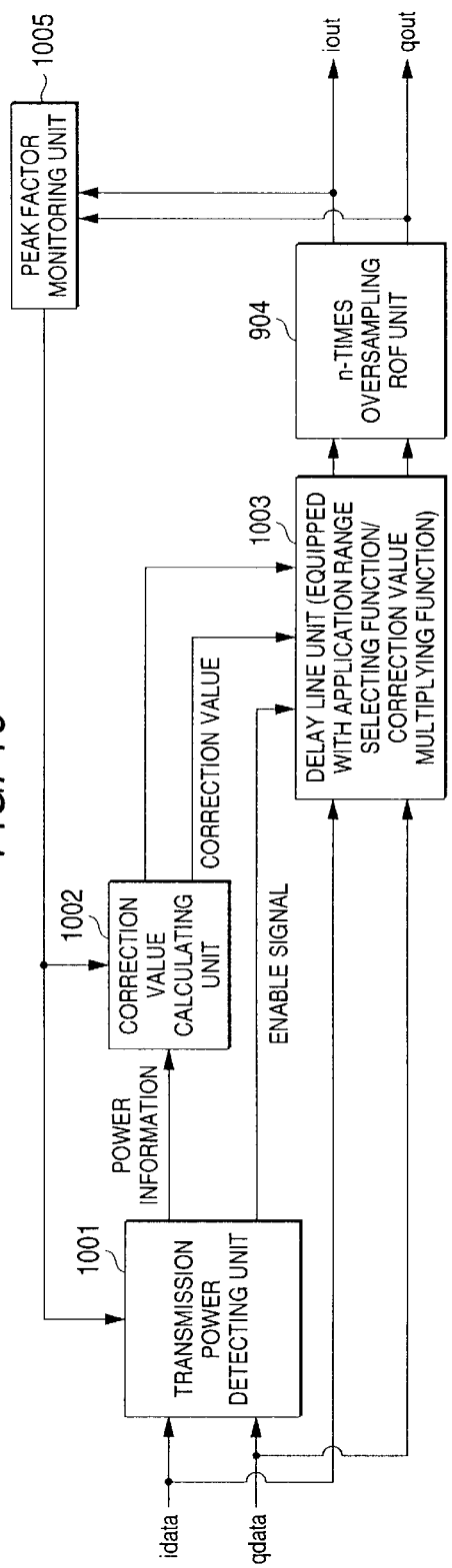
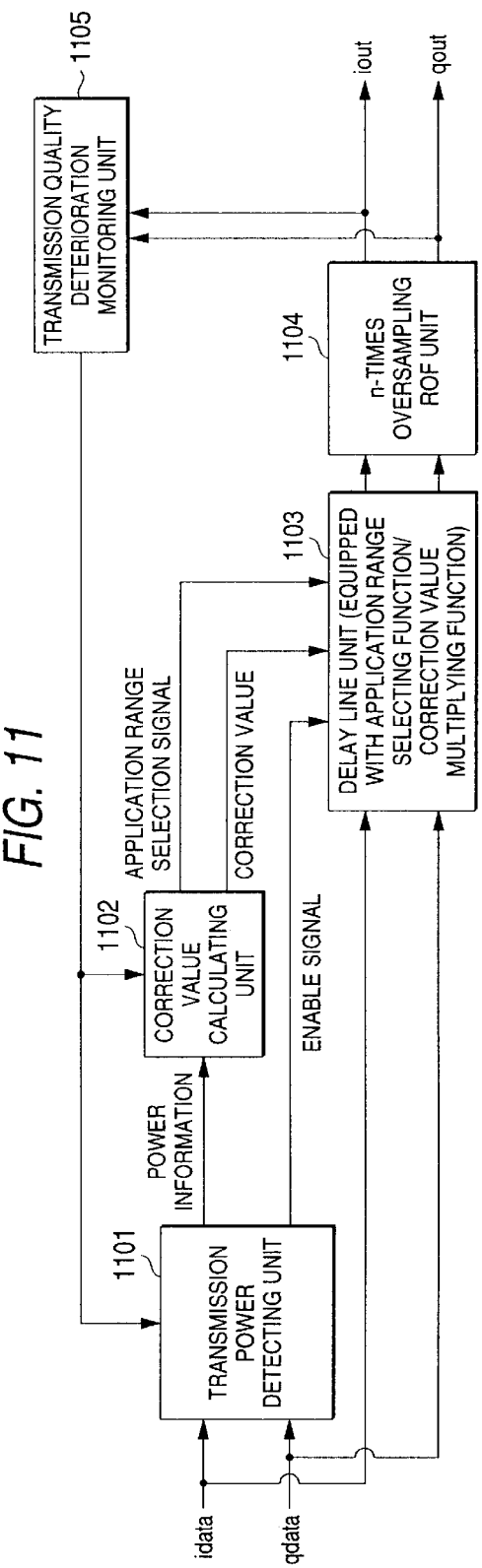

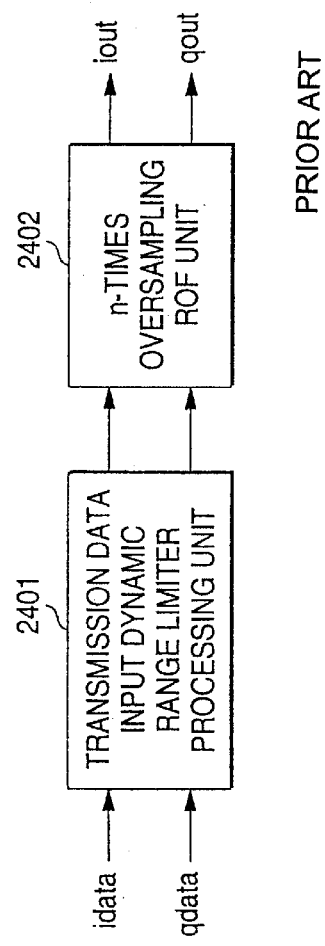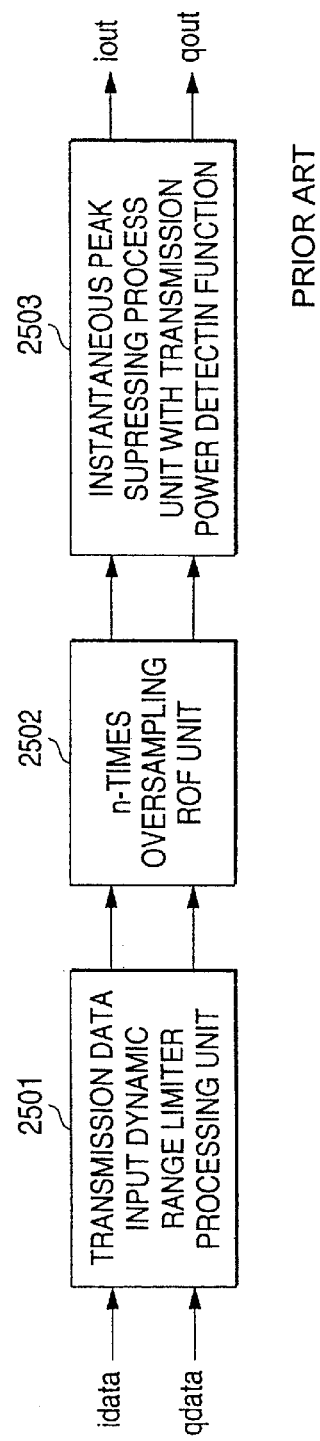

TRANSMISSION BAND LIMITING FILTER APPARATUS AND TRANSMISSION APPARATUS

BACKGROUND OF THE INVENTION

1. Field of the Invention

The present invention is related to a transmission band limiting filter apparatus and a transmission apparatus. More specifically, the present invention is directed to a transmission band limiting filter and the like, which are used to execute a transmission band limiting process operation of transmission data for a portable telephone and a base station system.

2. Description of the Related Art

In a wireless mobile communication system, more particularly, in a cellular portable telephone system, a multiple access system is used in order to simultaneously establish communications between a base station and a plurality of mobile stations (communication terminals). In this multiple access system, a base station and/or plural mobile stations access empty wireless lines so as to establish wireless communications. This multiple access system is mainly subdivided into a frequency division multiple access (FDMA) system, a time division multiple access (TDMA) system, and a code division multiple access (CDMA) system. Then, a base station allocates such a multiple access parameter corresponding to a multiple access system employed in a relevant wireless communication system with respect to a mobile station.

In the FDMA system, a plurality of channels are formed by varying the frequency. In the TDMA system, a plurality of channels are formed by slightly shifting time. To the contrary, in the CDMA system, while all of the frequencies and time are used, since the channels are discriminated from each other based upon the specific codes transmitted with being multiplexed on the signals, there are such drawbacks that the frequency components would be broadened, the frequency utilizing efficiency would be lowered, and thus, the broad band line should be used. However, this TDMA system may own such a feature that since the codes are multiplexed to convert the signals, the high secrecy characteristic could be maintained. Therefore, this TDMA system has been widely used.

On the other hand, in the CDMA system, in particular, while a multiplexing process operation is carried out, there are certain possibilities that a large current instantaneously flows. A so-called "limiter function" capable of limiting transmission power may constitute a major important factor in this CDMA system.

Conventionally, a transmission apparatus equipped with a peak amplitude suppression function is disclosed in, for example, Japanese Patent Laid-open Patent No. Hei(JPA)-9-18451.

As indicated in FIG. 24, a transmission band limiting apparatus employed in such a CDMA system that while a spread spectrum communication system is employed, a plurality of users are stored within the same frequency band, is constituted by a transmission data input dynamic range limiter processing unit 2401, and also an n-times oversampling ROF unit 2402. The transmission data input dynamic range limiter processing unit 2401 limits an amplitude of multiplexed data. The n-times oversampling ROF unit 2402 samples the output data of this transmission data input dynamic range limiter processing unit 2401, and cuts off such output data having a large amplitude.

First, the transmission data which are multiplexed and are entered from an input terminal "$i_{data}$" and another input terminal "$q_{data}$" are inputted into the transmission data input dynamic range limiter processing unit 2401. Then, this transmission data input dynamic range limiter processing unit 2401 performs the input dynamic range limit with respect to such input transmission data having a value larger than a preset value, so that the maximum value of the transmission data is suppressed.

Next, the transmission data whose maximum value has been suppressed by the transmission data input dynamic range limiter processing unit 2401 is entered to the n-times oversampling transmission band limiting filter unit 2402 so as to be processed by the transmission band limiting process operation thereof. Then, the transmission data which have been processed by the band limiting process operation by the n-times oversampling transmission band limiting filter unit 2402 are transferred via an output terminal "$i_{out}$" and another output terminal "$q_{out}$" to a post stage.

On the other hand, as shown in FIG. 25, the transmission data which has been processed by the band limiting process operation by the n-times oversampling transmission band limiting filter unit 2402 is further processed by an instantaneous peak suppression processing unit 2503 so as to suppress an instantaneous peak of this transmission data. The above-described apparatus has been proposed. Similar to the first-mentioned apparatus shown in FIG. 24, in this apparatus, transmission data which are multiplexed and entered from an input terminal "$i_{data}$" and another input terminal "$q_{data}$" are inputted into a transmission data input dynamic range limiter processing unit 2501. This transmission data input dynamic range limiter processing unit 2501 performs an input dynamic range limiting operation with respect to such input data having a value larger than a set value in order to suppress the amplitude of the transmission data.

Next, the transmission data whose maximum value has been suppressed by the transmission data input dynamic range limiter processing unit 2501 is entered to an n-times oversampling transmission band limiting filter unit 2502 so as to be processed by the transmission band limiting process operation thereof. Then, the transmission data which has been processed by the band limiting process operation by the n-times oversampling transmission band limiting filter unit 2502 produces a peak value different from such a peak value which is suppressed by the peak value producing factor owned by the n-times oversampling transmission band limiting filter unit 2502, although the amplitudes of the transmission data have been suppressed by the transmission data input dynamic range limiter unit 2501. As a consequence, with respect to the transmission data outputted from the n-times oversampling transmission band limiting filter unit 2502, the processing unit 2503 equipped with both the transmission power detection function and the instantaneous peak suppression function suppresses both an instantaneous peak and a peak value of such a signal having a value larger than the value which is again set. Next, the data outputted from this processing unit 2503 are transferred via the output terminal "$i_{out}$" and another output terminal "$q_{out}$" to the post stage.

In the transmission control system shown in FIG. 24 arranged by the transmission data input dynamic range limiter unit 2401 and the n-times oversampling transmission band limiting filter unit 2402, in such a case that the transmission power variation in the time axis by the transmission data entered into the input terminals "$i_{data}$" and "$q_{data}$" represent such a large fluctuation characteristic as indicated in FIG. 17, the band limiting process operation (limiting process) is carried out by the transmission data input dynamic range limiter unit 2401 in response to the set limited value. As a consequence, while the instantaneous peak value is suppressed and the upper limit value of the transmission power variation is removed (see FIG. 18), such transmission data having no transmission power variation can be obtained.

However, in the case that the transmission data which has been limiter-processed by the transmission data input dynamic range limiter unit 2401 is inputted into the n-times oversampling transmission band limiting filter unit 2402, the transmission power variation again owns such a characteristic having a high instantaneous peak, as indicated in FIG. 19. Although the instantaneous peak of the transmission power variation has been suppressed as illustrated in FIG. 18, another instantaneous peak value which is caused by a different occurrence factor would occur. This instantaneous peak value is caused by the convolution process operation with respect to both the impulse response characteristic and the transmission data stream owned by the n-times oversampling transmission band limiting filter unit 2402. Therefore, there is such a problem that this instantaneous peak value would occur irrespective of the input transmission data.

On the other hand, in accordance with the transmission power control apparatus shown in FIG. 25, the instantaneous peak value produced by the n-times oversampling transmission band limiting filter 2502, which causes the above-described problem in the transmission power control apparatus of FIG. 24, may be suppressed to such an arbitrary amplitude set by the processing unit 2503. The transmission power control apparatus is constructed of the transmission data input dynamic range limiter unit 2501, the n-times oversampling transmission band limiting filter 2502, and the processing unit 2503 equipped with both the transmission power detecting function and the instantaneous peak suppressing function. As represented in FIG. 20, the transmission power variation may have such a power characteristic having no variation with respect to the time axis. An ordinate of FIG. 20 indicates a transmission power variation, while an abscissa of FIG. 20 denotes transmission time. However, this amplitude suppressing method may cause the suppression adverse influence, so that this adverse influence is left in the transmission data as the nonlinear distortion of the amplitude component in the time axis, and as shown in FIG. 21, the frequency characteristic of the transmission data, which is obtained by the band limiting process operation, is broadened around the band, so that the frequency characteristic would be considerably deteriorated, resulting in another problem. FIG. 21 represents a gain (dB) in the case that the frequency peak is set to a center of the abscissa thereof.

The present invention has been made to solve the above-explained problems, and therefore, has an object to provide such a transmission system capable of effectively suppressing an instantaneous peak value of transmission electric power required to transmit data, and also capable of transmitting data, while reducing distortions and also maintaining a better frequency characteristic. In other words, an object of the present invention is to constitute such a transmission system operable in a high efficiency and low power consumption, while a region capable of compensating for a linearity of an amplifier can be made small.

SUMMARY OF THE INVENTION

The present invention has been made to solve the above-explained problems, and is featured by arranging a correcting unit at a prestage of an ROF unit in the CDMA communication system. An instantaneous electric power amount is calculated so as to be compared with a preset upper limit value. When the calculated instantaneous electric power amount exceeds this upper limit value, the correcting unit detects it as an instantaneous peak, and selectively performs an amplitude correction only when the calculated instantaneous electric power amount exceeds the upper limit value so as to reduce distortions of a region located in the vicinity of a region to be corrected.

That is to say, a first aspect of the present invention is featured by such a transmission band limiting filter apparatus equipped with a peak amplitude suppressing function, for performing a transmission band limiting process operation, comprising:

correction unit for calculating a transmission power of a transmission data intersected and comparing the transmission power with a predetermined upper limit with a preset upper limit value in such a manner that when the transmission power exceeds the upper limit value, the transmission power is detected as an instantaneous peak value and correcting the transmission amplitude selectively, prior to filtering in filter unit.

Namely in the present invention, factor of the amplitude limit is not set according to a constant value which is set by outside, amplitude limit is determined according to considering a transmission data and another instantaneous peak value generated by processing the transmission data in the filter unit. And by limiting only necessary part of the transmission data, the transmission band limiting filter apparatus can transmit the data in high reliability without any nonlinear distortion caused by the peak amplitude suppression. Therefore correction is conducted by considering an affect in filer unit, and the corrected date is transmitted into the filter unit. According to the structure, the transmission band limiting filter apparatus can transmit the data in almost all frequency range in high reliability without any nonlinear distortion caused by the peak amplitude suppression.

That is to say, a second aspect of the present invention is featured by such a transmission band limiting filter apparatus equipped with a peak amplitude suppressing function, for performing a transmission band limiting process operation of I-channel transmission data and Q-channel transmission data which is intersected orthogonal to the I-channel transmission data, comprising:

(a) a transmission amplitude calculating unit for calculating a transmission amplitude and transmission power of each of the I-channel transmission data and the Q-channel transmission data intersected orthogonal to the I-channel transmission data;

(b) a transmission power detecting unit for detecting an instantaneous peak value by comparing the transmission power with a preset upper limit value in such a manner that when the transmission power exceeds the upper limit value, the instantaneous peak value appears;

(c) an application range calculating unit for determining an application range of a correction based upon the detection information of the instantaneous peak value detected by the transmission power detecting unit;

(d) a correction value calculating unit for determining an amplitude correction value of the transmission amplitude based on the detection information of the instantaneous peak value;

(e) an enable signal produced by the transmission power detecting unit based upon the appearing timing information of the instantaneous peak value;

(f) a delay line equipped with a correction value function, constituted by a delay line having a correcting unit, for holding both the amplitude correction value supplied from the correction value calculating unit and also the transmission data from which the instantaneous peak value is detected, and for performing the correction in response to the enable signal, the correcting unit correcting the held transmission data based on the amplitude correction value; and (g) a transmission band limiting filter for executing a band limiting process operation of the transmission data after being corrected, which is obtained from the delay line equipped with the correction value function.

With employment of the above-described arrangement, the transmission band limiting filter apparatus can transmit the data in high reliability without any nonlinear distortion caused by the peak amplitude suppression.

A third aspect of the present invention is featured by such a transmission band limiting filter apparatus equipped with a peak amplitude suppressing function as recited in claim 1 wherein: the transmission amplitude calculating unit is comprised of an electric power calculating unit for calculating instantaneous transmission power based on the output of the transmission amplitude calculating unit; and the transmission power calculating unit owns a data saving function capable of externally setting arbitrary numeral data, and includes: an upper limit value storing apparatus for storing thereinto a power upper limit value; a transmission power comparing unit for comparing the instantaneous transmission power obtained by the electric power calculating unit with the power upper limit value stored in the upper limit value storing apparatus; and a signal converting unit for converting a comparison result obtained by the transmission power comparing unit into the enable signal.

With employment of the above-explained arrangement, in addition to the first effect of the present invention, the transmission band limiting filter apparatus can externally control the upper limit value, and also can perform the adjustment in response to the use condition.

A fourth aspect of the present invention is featured by such a transmission band limiting filter apparatus equipped with a peak amplitude suppressing function as recited in claim 1 wherein:

the correction value calculating unit includes:

(a) a calculating unit for calculating a reciprocal of the instantaneous transmission power entered from the transmission power detecting unit; and (b) a multiplying unit for multiplying the power upper limit value stored in the upper limit storing apparatus by the calculated reciprocal of the instantaneous transmission power.

With employment of the above-explained arrangement, in addition to the first effect of the present invention, the transmission band limiting filter apparatus can achieve such an effect that the calculation can be readily carried out.

A fifth aspect of the present invention is featured by such a transmission band limiting filter apparatus equipped with a peak amplitude suppressing function as recited in claim 3 wherein:

the application range selecting unit is arranged in such a manner that the correction application range with respect to the transmission data is selected based upon the numeral value entered from the multiplying unit.

A sixth aspect of the present invention is featured by such a transmission band limiting filter apparatus equipped with a peak amplitude suppressing function as recited in claim 1 wherein:

the delay line unit equipped with the correction function includes:

(a) a first selecting unit for selectively switching conditions as to whether or not the transmission data is corrected in correspondence with the numeral value entered from the correction value calculating unit based upon the enable signal entered from the transmission power detecting unit;

(b) a second selecting unit for selectively switching conditions as to whether or not the respective transmission data are separately corrected in response to the application range selection signal entered from the correction value calculating unit;

(c) a delay line constructed of the data saving function capable of saving the transmission data which is used to detect the instantaneous peak value by the transmission power detecting unit; and (d) a multiplying unit arranged between the data saving function for constituting the delay line and the data saving function, for separately multiplying the outputs of the first and second selecting functions by the transmission data stored in the data saving function.

A seventh aspect of the present invention is featured by such a transmission band limiting filter apparatus equipped with a peak amplitude suppressing function as recited in claim 1 wherein:

the delay line equipped with the correction value multiplying function is arranged by that the transmission data from which the instantaneous peak value has been detected is held, and the multiplication with the amplitude correction value is performed only for a portion of the transmission data which constitutes the subject of the application range.

A eighth aspect of the present invention is featured by such a transmission band limiting filter apparatus equipped with a peak amplitude suppressing function as recited in claim 1 wherein:

the delay line unit equipped with the correction value multiplying function includes:

(a) a selecting unit for selectively switching conditions as to whether or not the transmission data is corrected in correspondence with the correction value entered from the correction value calculating unit based upon the enable signals entered from the transmission power detecting unit and also the transmission amplitude calculating unit;

(b) a delay line constructed of the data saving function capable of saving the transmission data which is used to detect the instantaneous peak values by the transmission power detecting unit and the transmission amplitude calculating unit; and (c) a multiplying unit arranged between the data saving function for constituting the delay line and the data saving function, for separately multiplying the outputs of the respective selecting functions by the transmission data stored in the data saving function.

An eleventh aspect of the present invention is featured by such a transmission band limiting filter apparatus equipped with a peak amplitude suppressing function as recited in claim 1 wherein:

the transmission amplitude calculating unit and the transmission power detecting unit are further comprised of:

(b) a signal phase changing amount calculating unit for calculating a phase changing amount of an arbitrarily settable signal section based upon the output of the transmission amplitude calculating function; and (f) a converting unit for converting a comparison result between the phase changing amount detected by the signal phase changing amount detecting unit and the transmission power comparing function into the enable signals.

A tenth aspect of the present invention is featured by such a transmission band limiting filter apparatus equipped with a peak amplitude suppressing function as recited in claim 1 wherein:

the transmission amplitude calculating unit and the transmission power detecting unit are further comprised of:

(b) a signal phase changing amount calculating unit for calculating a phase changing amount of an arbitrarily settable signal section based upon the output of the transmission amplitude calculating function;

(c) a signal amplitude changing amount detecting unit for detecting an amplitude changing amount of an arbitrarily settable signal section based upon the output of the transmission amplitude calculating function; and (g) a converting unit for converting a comparison result between the phase changing amount detected by the signal phase changing amount detecting unit and the transmission power comparing function into the enable signals.

An eleventh aspect of the present invention is featured by such a transmission band limiting filter apparatus equipped with a peak amplitude suppressing function as recited in claim 1, further comprising:

(f) a transmission power monitoring unit for monitoring a power difference between move averaged transmission power of the transmission data processed by the transmission band limiting filter and set reference power, .and for calculating a power adjusting value based upon the detected power difference; and (g) a multiplying function unit for multiplying the move averaged transmission power of the transmission data processed by the transmission band limiting filter by the power adjusting value entered from the transmission power monitoring unit.

A twelfth aspect of the present invention is featured by such a transmission band limiting filter apparatus equipped with a peak amplitude suppressing function as recited in claim 1, further comprising:

(f) a transmission power detecting unit for calculating an instantaneous peak value based upon both move averaged transmission power of the transmission data processed by the transmission band limiting filter and also instantaneous transmission power, for calculating a peak difference between the calculated instantaneous peak value and the set reference instantaneous peak value; and for performing a transmission amplitude calculation and transmission power in such a manner that an instantaneous peak value optimized with respect to a transmission analog amplifier connected subsequent to the transmission power detecting unit is again set; and also an instantaneous peak value monitoring unit for executing a feedback control with respect to the correction value calculating unit.

An thirteenth aspect of the present invention is featured by such a transmission band limiting filter apparatus equipped with a peak amplitude suppressing function as recited in claim 1, further comprising: (f) a transmission quality deterioration monitoring unit for calculating a waveform error on a time axis between a waveform shape of the transmission data processed by the transmission band limiting filter and a shape of a set reference transmission waveform; and for feedback-controlling both the transmission power detecting unit and the correction value calculating unit in order that such a waveform error within a transmission quality deterioration characteristic which is allowable within performance is obtained with respect to a receiver for receiving the transmitted data.

A fourteenth aspect of the present invention is featured by such a transmission apparatus used in the CDMA system for storing a plurality of users within the same frequency range, while employing the spread spectrum system, comprising:

(a) a user monitoring unit for monitoring transmission data corresponding to the plurality of users;

(b) a spread-modulating and data multiplexing unit for spread-modulating each of the transmission data inputted from the user managing unit and also for multiplexing the spread-modulated transmission data;

(c) an input dynamic range limiter unit for suppressing an amplitude peak value of data entered from the spread-modulating and data multiplexing unit, and for controlling an input dynamic range with respect to a band limiting process unit provided at a post stage;

(d) a transmission band limiting filter apparatus equipped with a peak amplitude suppressing function, for executing a transmission band limiting process operation with respect to both I-channel transmission data and Q-channel transmission data intersected orthogonal to the I-channel transmission data, which are entered from the input dynamic range limiter unit;

(e) a D/A converting unit for D/A-converting the transmission data entered from the transmission band limiting filter apparatus equipped with the peak amplitude suppressing function;

(f) an analog post filter for removing a folding data portion which is produced during the D/A converting operation with respect to the transmission data entered from the D/A converting unit;

(g) a quadrature modulator for performing a quadrature modulating operation at an arbitrary frequency with respect to the transmission data entered from the analog post filter;

(h) a transmission analog amplifying unit for amplifying the transmission data entered from the quadrature modulator; and (i) an antenna for actually transmitting the transmission data entered from the transmission analog amplifying unit.

BRIEF DESCRIPTION OF THE DRAWINGS

FIG. 10 is a block diagram for showing a transmission band limiting filter arrangement equipped with a peak factor monitoring function and a peak suppressing function according to a sixth embodiment mode of the present invention.

FIG. 11 is a block diagram for showing a transmission band limiting filter arrangement equipped with a transmission quality monitoring function and a peak suppressing function according to a seventh embodiment mode of the present invention.

FIG. 24 is a block diagram for indicating the conventional filter arrangement for executing the limiting process to the transmission data.

FIG. 25 is a block diagram for representing the conventional filter arrangement for suppressing only the peak of the transmission data after being processed by the band limiting process operation.

DESCRIPTION OF THE PREFERRED EMBODIMENTS

Figure 13:
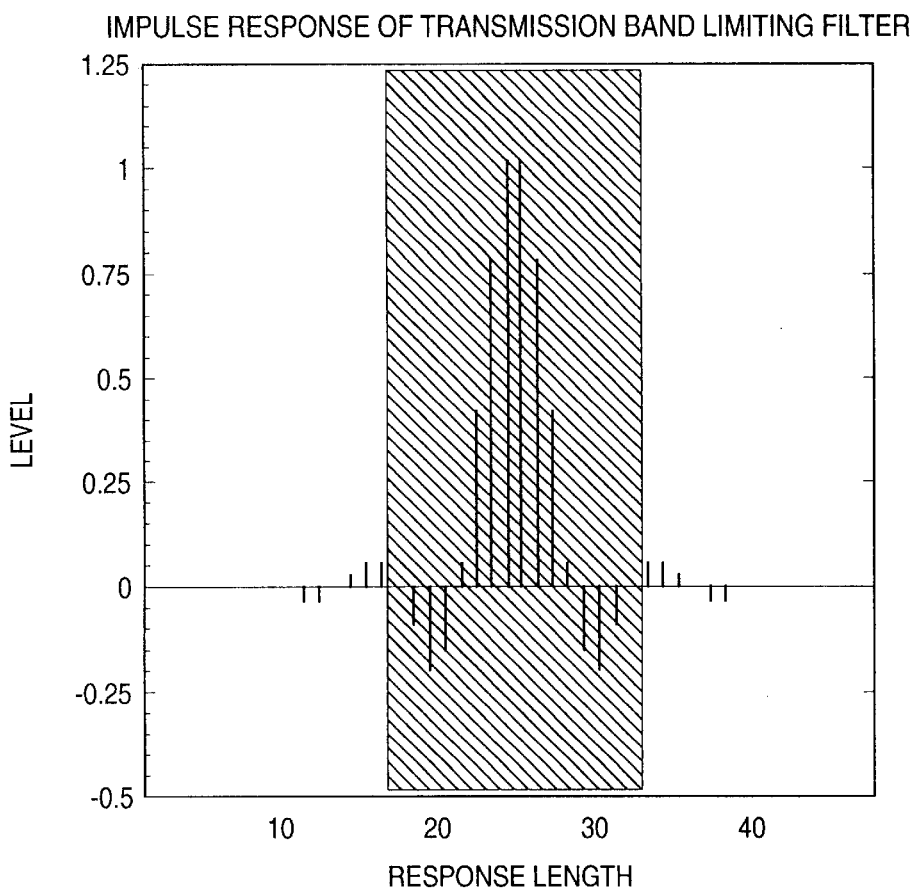
FIG. 13 is a diagram for showing an example of a transmission band limiting filter impulse response.

First, a concept of the present invention will now be made with reference to drawings. Assuming now that a transmission band limiting filter is arranged by an FIR type digital filter and an impulse response waveform of this filter is constituted by+6 symbols and−6 symbols in a length of this impulse response by n-times oversampling, such an impulse response waveform of the transmission band limiting filter is obtained as shown in FIG. 13. Normally, a band limiting process operation is carried out by the convolution by 4-times oversampling this impulse response and transmission data equivalent to+6 symbols and−6 symbols. The impulse response waveform has such a feature that while a coefficient value located at a center portion is largely broadened along right/left directions, the coefficient value is decreased. Thus, in such a case that as to an amplitude of transmission data produced in this filter, both the coefficient value located at the center portion of the impulse response and also relatively large transmission data are inputted, an occupation ratio of this transmission data to the process result by the convolution is increased. In other words, if the entered transmission data is small, then the processed result is also decreased.

Figure 14:
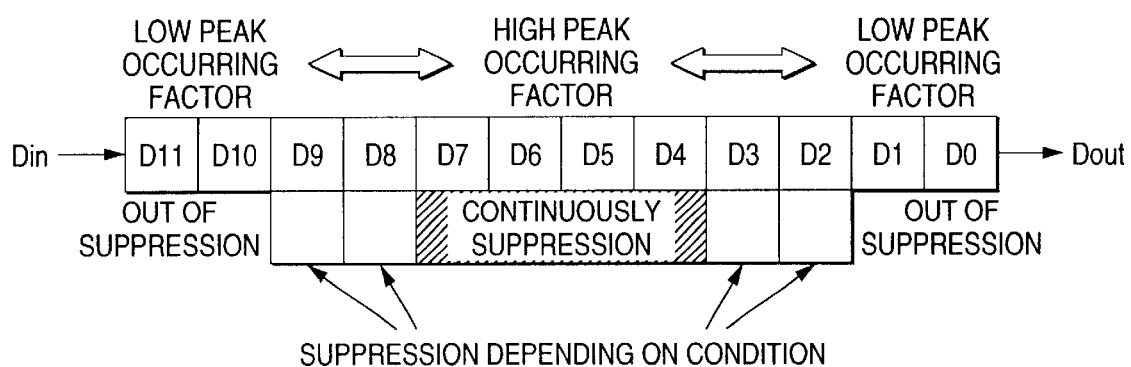
FIG. 14 is a diagram for indicating an example of an amplitude suppression application range.

FIG. 14 shows a delay line having an amplitude suppressing function. In delay lines D0 to D11, transmission data inputted from Din is shifted from a left direction to a right direction. The transmission data stored in the delay line D4 to D7 among the transmission data stored in the delay line D0 to D11 correspond to data which are multiplied by the coefficient located at the center portion of the impulse response. In other words, when a detection circuit, or the like detects an instantaneous peak value, a phase changing amount larger than, or equal to a predetermined amount, and an amplitude changing amount larger than, or equal to a preselected amount, the transmission data stored in the delay lines D4 to D7 among the transmission data stored in the delay lines are again set in such a manner that the values of these transmission data are decreased smaller than the present values. The transmission data which have been again set are inputted into the transmission band limiting filter so as to be processed by the transmission band limiting process operation. As a result, the convoluted process result can be decreased and thus, the instantaneous peak value can be suppressed.

Figure 15:
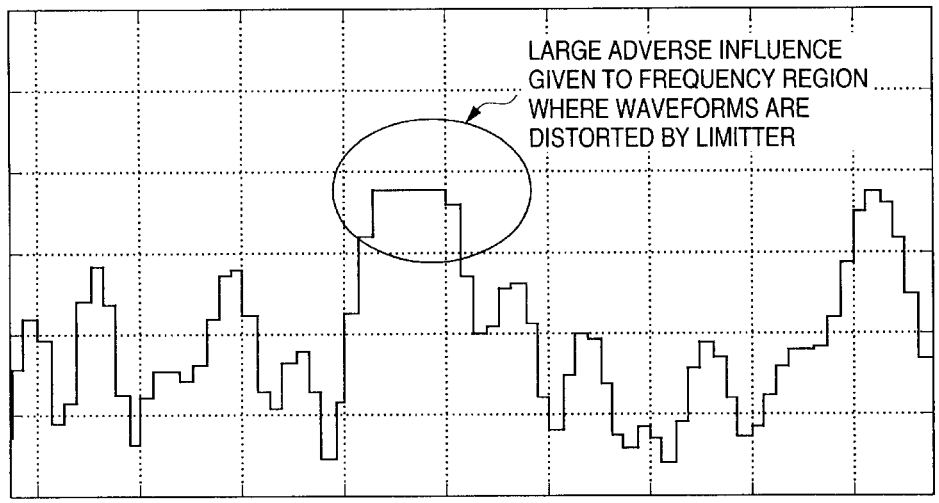
FIG. 15 is a diagram for representing an output example by the filter arrangement of FIG. 6.
Figure 16:
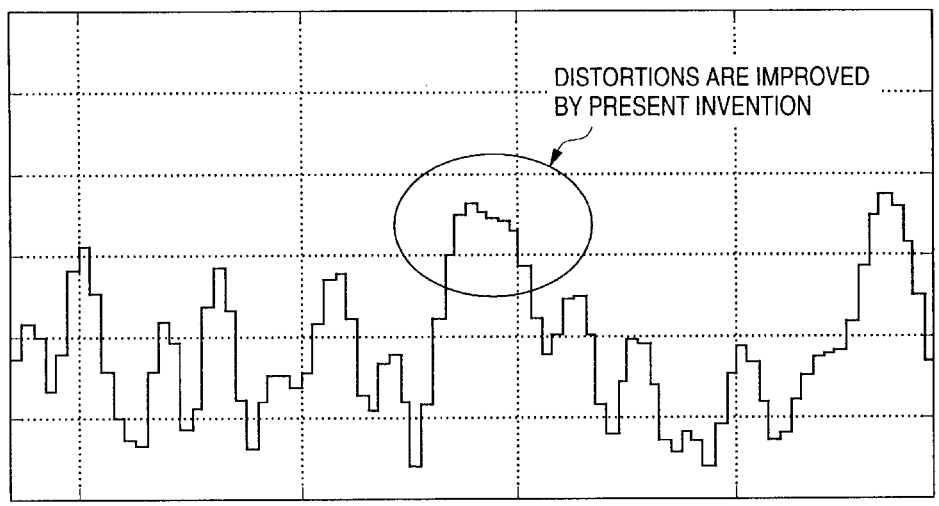
FIG. 16 is a diagram for showing an output example by the arrangement of the present invention.
Figure 17:
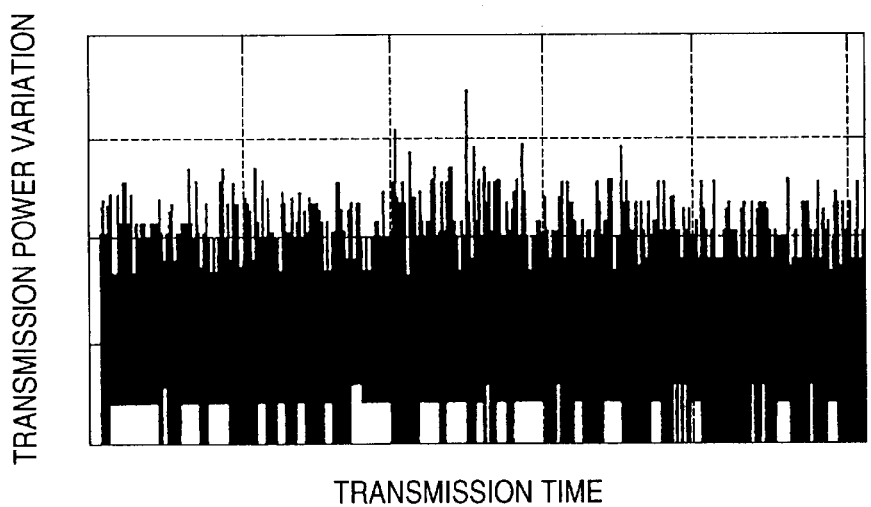
FIG. 17 is a diagram for indicating a transmission data transmission power variation characteristic for data multiplexing operation.
Figure 18:
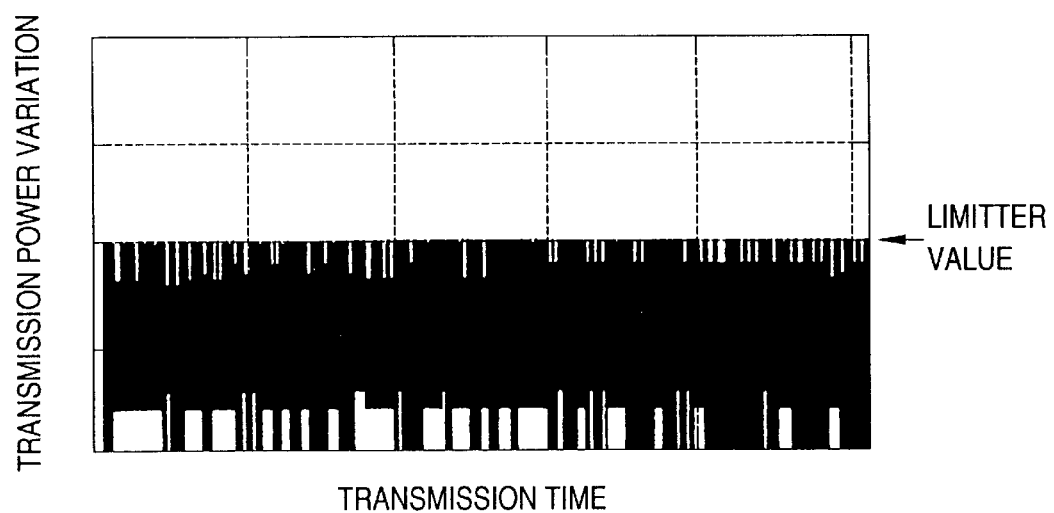
FIG. 18 is a diagram for showing a transmission power variation characteristic for transmission data input dynamic range limiter output.
Figure 19:
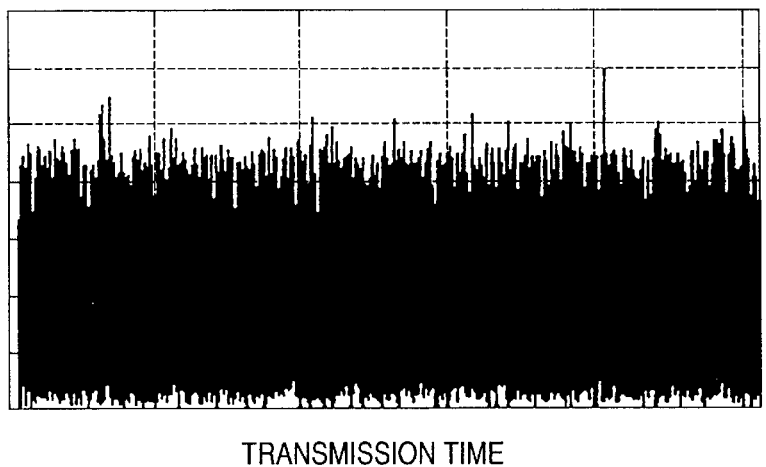
FIG. 19 is a diagram for showing a transmission power variation characteristic of a transmission band limiting filter.
Figure 20:
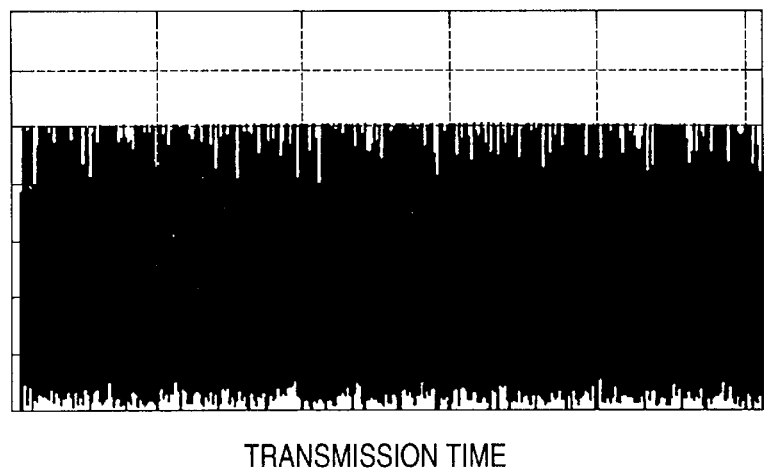
FIG. 20 is a diagram for indicating a transmission power variation characteristic by the prior art (FIG. 25).
Figure 21:
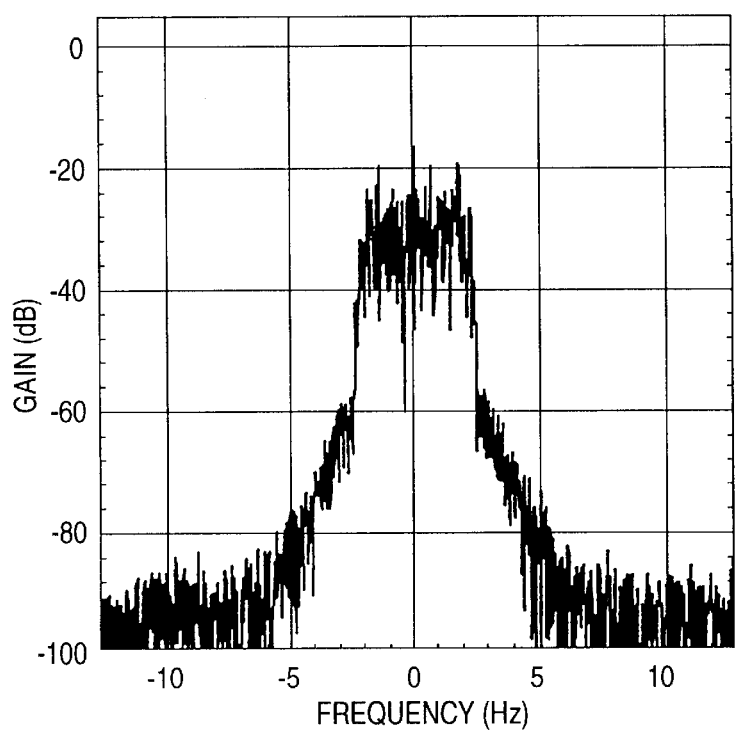
FIG. 21 is a diagram for indicating a transmission frequency variation characteristic by the prior art (FIG. 25).
Figure 22:
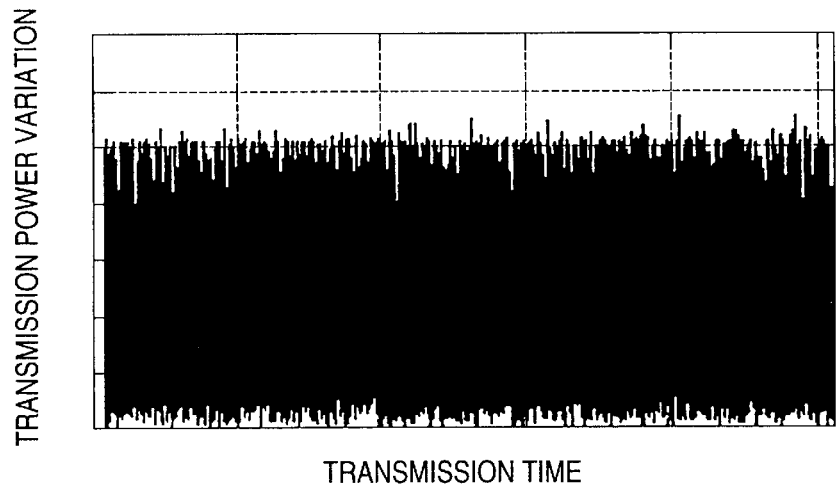
FIG. 22 is a diagram for indicating a transmission power variation characteristic of a transmission level detecting function output and a peak suppressing function output.
Figure 23:
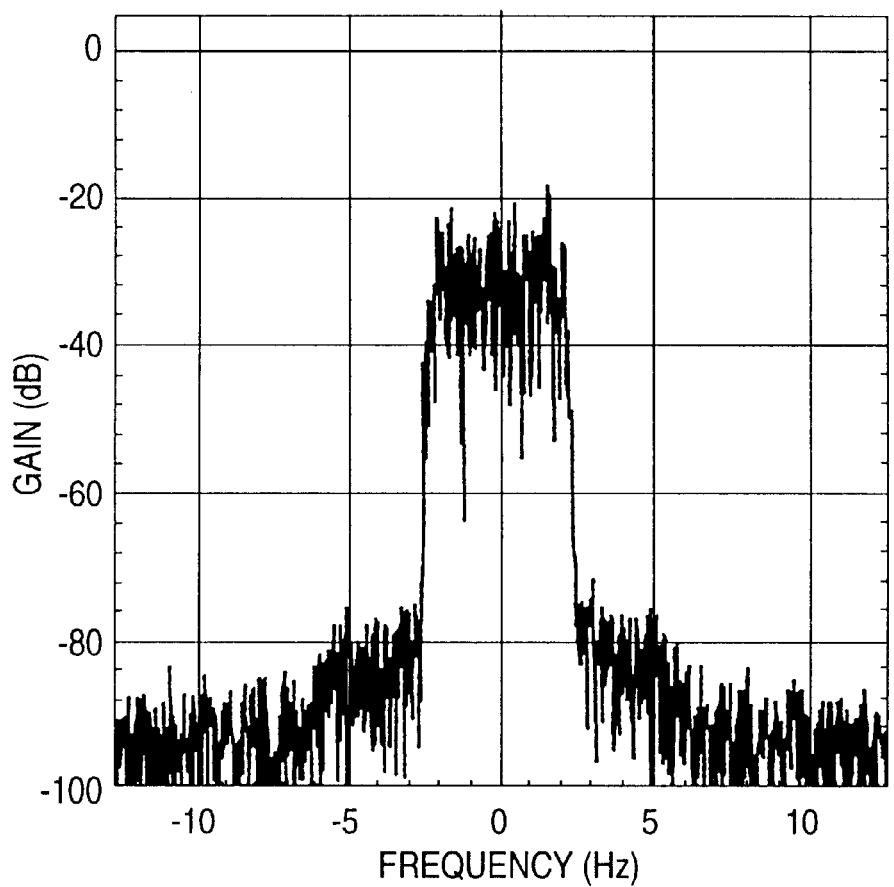
FIG. 23 is a diagram for indicating a transmission frequency variation characteristic of a transmission level detecting function output and a peak suppressing function output.

As a result of these calculation process operations, in the output example by the conventional filter arrangement shown in FIG. 25, since the transmission data which has been processed by the transmission band limiting process is directly multiplied by the correction value, the waveform as indicated in FIG. 15 is clipped, so that a large amount of nonlinear distortions are outputted with respect to the frequency region. To the contrary, while an arrangement of a transmission band limiting filter apparatus of the present invention as shown in FIG. 22 owns a similar output to the conventional filter arrangement indicated in FIG. 20, a linear calculation is maintained as in a waveform of FIG. 16, and a processed result is not clipped. As a result, as represented in FIG. 23, there is completely no frequency component distortion in connection with a suppression.

Embodiment Mode 1

Figure 1:
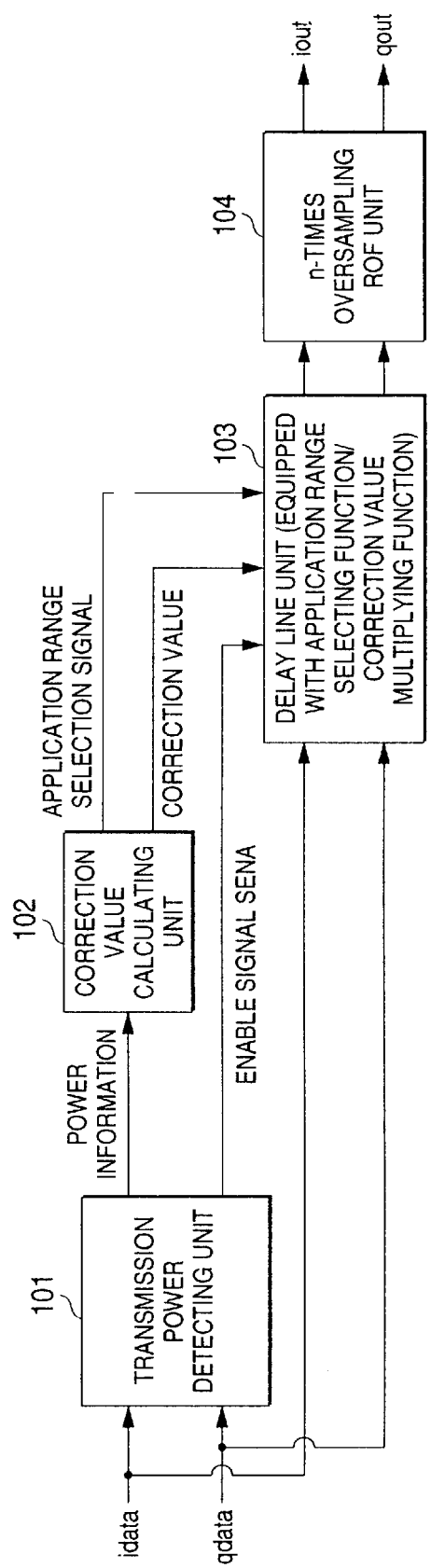
FIG. 1 is a block diagram for showing a transmission band limiting filter arrangement equipped with a peak suppressing function, according to a first embodiment mode of the present invention.
Figure 2:
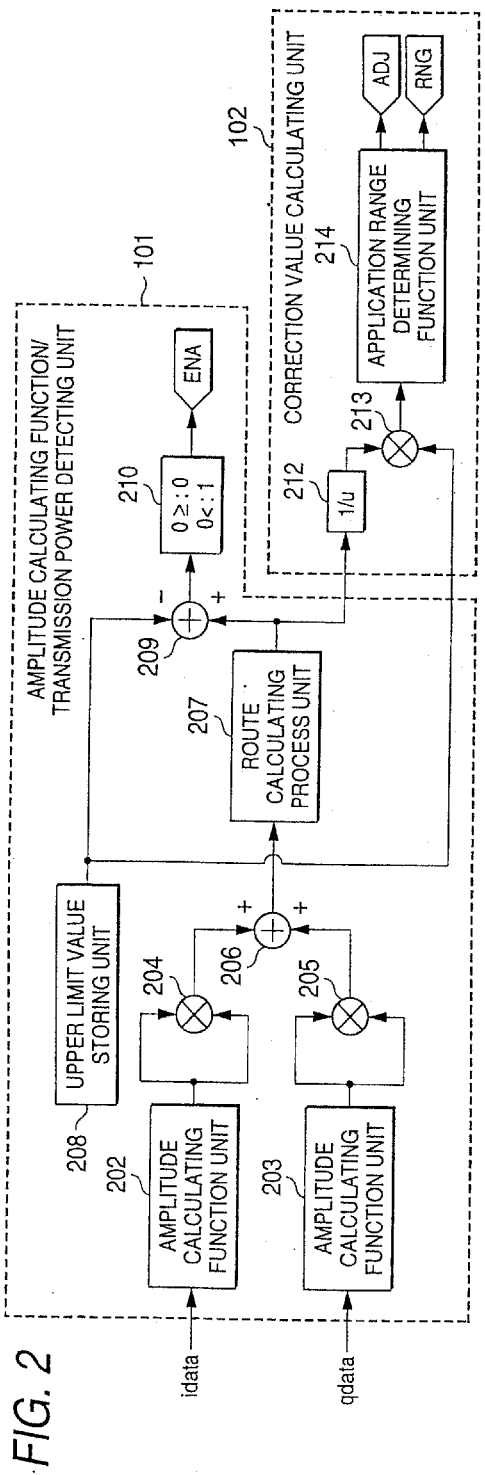
FIG. 2 is a block diagram for indicating an amplitude calculating function, a transmission power detecting unit, and a correction value calculating unit of the filter according to the first embodiment.
Figure 3:
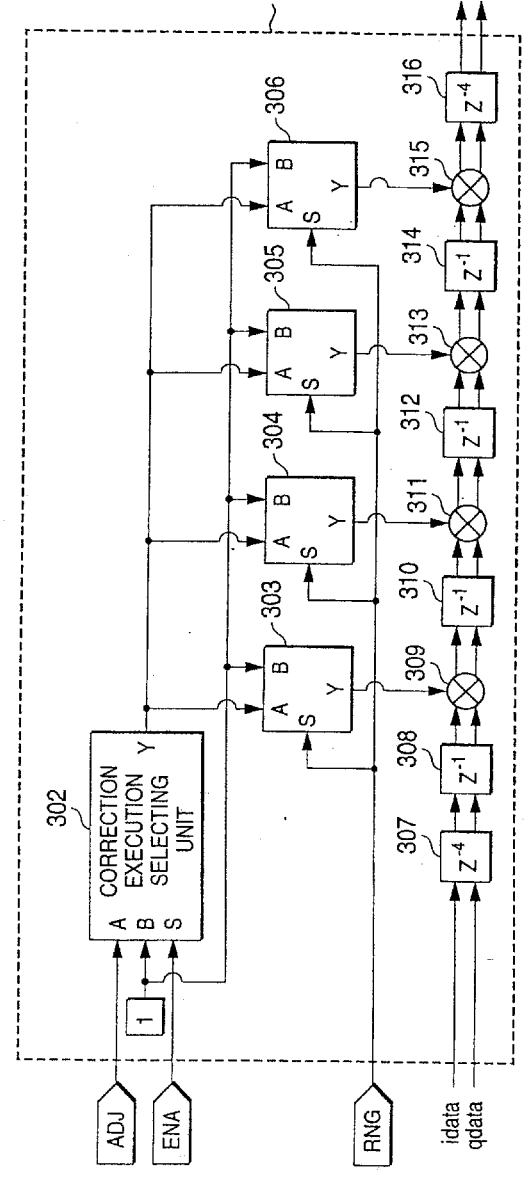
FIG. 3 is a block diagram for representing a delay line unit equipped with a correction value multiplying function of the filter according to the first embodiment.

Referring now to FIG. 1 to FIG. 3, a description will be made of a first embodiment mode of the present invention.

As indicated in FIG. 1, a transmission band limiting filter apparatus equipped with a peak amplitude suppressing function, according to the first embodiment mode of the present invention, is arranged by employing a transmission power detecting unit 101, a correction value calculating unit 102, and a delay line unit 103 in such a manner that the output data of this delay line unit 103 are derived via an n-times oversampling ROF unit 104 as parallel outputs "$i_{data}$" and "$q_{data}$". The transmission power detecting unit 101 calculates amplitudes and electric power amounts from transmission data which are entered from parallel input terminals "$i_{data}$" and "$q_{data}$", and also detects as to whether or not the calculated power amount exceeds a preset upper limit value. The correction value calculating unit 102 is connected to this transmission power detecting unit 101, and calculates both an application range and a correction value. The delay line unit 103 is connected to this correction value calculating unit 102, and also is equipped with an application range selecting function and a correction value multiplying function.

Next, a description will now be made of a function of this transmission band limiting filter apparatus. In FIG. 1, the transmission data which are entered from the input terminal "$i_{data}$" and the input terminal "$q_{data}$" are entered into the transmission power detecting unit 101 equipped with both the amplitude calculating function and the transmission power detecting function. The transmission power detecting unit 101 previously calculates a transmission amplitude and transmission power when transmission data is transmitted, and then compares this calculated transmission power with a previously set upper limit value of the transmission power. In such a case that such an instantaneous power value larger than this upper limit value appears, the transmission power detecting unit 101 detects this large instantaneous power value as an "instantaneous peak." Next, when the transmission power exceeds this upper limit value, the transmission power detecting unit 101 outputs an enable signal "$S_{ENA}$" at this time instant. The correction value calculating unit 102 calculates the above-described amplitude correction value based upon both the transmission power of the transmission data and the upper limit value of the transmission power, which are entered from the transmission power detecting unit 101, to thereby output the calculated amplitude correction value. At the same time, this correction value calculating unit 102 outputs an application range selection signal to which the amplitude correction value is actually applied. The delay line unit 103 owns such a function capable of holding such transmission data which is used to detect the transmission power of the transmission data by the transmission power detecting unit 101, and saves the transmission data entered from the input terminals "$i_{data}$" and "$q_{data}$" into a delay line.

Next, in synchronism with the enable signal entered from the transmission power detecting unit 101, the delay line unit 103 multiplies the amplitude correction value with respect to only the transmission data selected by using the application range selection signal entered from the correction value calculating unit 102 so as to correct the amplitude of the transmission data, and then outputs the amplitude-corrected transmission data. The n-times oversampling ROF unit 104 executes the transmission band limiting process operation with respect to the amplitude-corrected transmission data which is inputted from the delay line unit 103, and then outputs the processed transmission data from the output terminals "$i_{out}$" and "$q_{out}$."

Next, operations of the above-described transmission power detecting unit 101 and also the above-mentioned correction value calculating unit 102 will now be explained more in detail with reference to FIG. 2. The transmission power detecting unit 101 calculates the transmission amplitudes of the transmission data entered from the input terminals "$i_{data}$" and "$q_{data}$" by using an amplitude calculating function unit 202 and an amplitude calculating function unit 203. The transmission power detecting unit 201 calculates instantaneous electric power by employing a multiplier 204, another multiplier 205, an adder 206, and a route circuit 207.

Next, an enable signal is produced by an adding/subtracting device 209 and an enable control unit 210, which are provided in this transmission power detecting unit 101. The adding/subtracting device 209 performs an adding/subtracting process operation between the output of the route circuit 207 and the upper limit value of the transmission power, which is externally settable and is stored in an upper limit value storing unit 208. The enable control unit 210 owns the following logical idea. That is to say, in the case that the instantaneous power exceeds the preset upper limit value of the transmission power, the amplitude correction is carried out based upon the adding/subtracting result of the adding/subtracting device 209, whereas when the instantaneous power does not exceed the upper limit value, the amplitude correction is not carried out.

Furthermore, the instantaneous power corresponding to the output of the route circuit 207 is entered into the correction value calculating unit 211. In the correction value calculating unit 211, while the entered instantaneous power is employed, a correction value is produced by a reciprocal calculating processor 212 and a multiplier 213. An application range determining function unit 214 outputs selection information which is required to vary an application range of transmission data whose amplitude should be corrected based upon the obtained correction value.

Next, the operation of the above-explained delay line unit 103 will now be explained more in detail with reference to FIG. 3. In the delay line unit 103, the transmission data is actually multiplied by the correction value to execute the correction process operation. This correction process operation is controlled by an enable signal entered from an enable signal "$S_{ENA}$" input terminal. The correction values entered from the correction value calculating units 211 (101) are inputted into a correction execution selecting unit 302 via a correction value input terminal. In synchronism with timing of the enable signal entered from the enable signal input terminal, the correction execution selecting unit 302 selectively outputs conditions as to whether or not the correction value entered from the correction value input terminal is outputted.

The output of the correction execution selecting unit 302 is connected to an input terminal A of a correction value selecting unit 303, an input terminal A of a correction value selecting unit 304, an input terminal A of a correction value selecting unit 305, and an input terminal A of a correction value selecting unit 306. On the other hand, a constant "1" is inputted into an input terminal B of each of the correction value selecting unit 303, the correction value selecting unit 304, the correction value selecting unit 305, and the correction value selecting unit 306. The switching operations between the input terminals A and the input terminals B with respect to the correction value selecting unit 303, the correction value selecting unit 304, the correction value selecting unit 305, and the correction value selecting unit 306 are separately controlled by the application range selection signals. The respective selection results are entered to a multiplier 309, a multiplier 311, a multiplier 313, and a multiplier 315, which correspond thereto.

Also, the transmission data entered from the input terminal "$i_{data}$" and the input terminal "$q_{data}$" are inputted into a delay device 307. The output of this delay device 307 is entered into another delay device 308. The transmission data entered from the delay device 308 is correction-processed by multiplying the held transmission data by the correction value entered from the correction value selecting unit 302 in the multiplier 309. Subsequently, the transmission data outputted from the multiplier 309 is entered to a delay device 310 provided at the post stage so as to be delay-processed. The transmission data entered from the delay device 310 is correction-processed by multiplying the held transmission data by the correction value entered from the correction value selecting unit 303 in the multiplier 311.

Subsequently, the transmission data outputted from the multiplier 311 is entered to a delay device 312 provided at the post stage so as to be delay-processed. The transmission data entered from the delay device 312 is correction-processed by multiplying the held transmission data by the correction value entered from the correction value selecting unit 304 in the multiplier 313. Subsequently, the transmission data outputted from the multiplier 313 is entered to a delay device 314 provided at the post stage so as to be delay-processed. The transmission data entered from the delay device 314 is correction-processed by multiplying the held transmission data by the correction value entered from the correction value selecting unit 305 in the multiplier 315. Next, transmission data outputted from the multiplier 315 is entered to a delay device 316 provided at the post stage so as to be delay-processed. The delay-processed transmission data is transferred via the output terminal "$i_{out}$" and the output terminal "$q_{out}$" to the n-times oversampling ROF unit 104 provided at the post stage in order to execute the band limiting process operation.

In the above-described embodiment mode 1, before the transmission data is entered to the n-times oversampling ROF unit 104, the correction process operation is carried out which can suppress the instantaneous peak produced by the n-times oversampling ROF unit 104. As a consequence, the transmission band limiting filter apparatus equipped with the peak amplitude suppressing function can reduce the instantaneous peak in the transmission power of the transmission signal, and can transmit the transmission signal having no distortion.

Embodiment Mode 2

Figure 4:
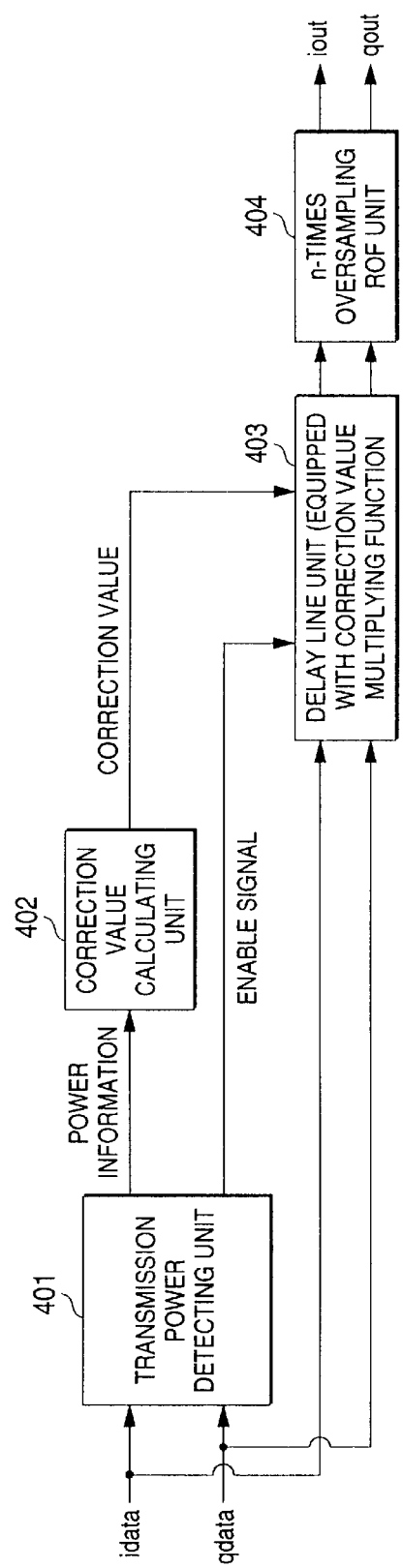
FIG. 4 is a block diagram for showing a transmission band limiting filter arrangement equipped with a peak suppressing function, according to a second embodiment mode of the present invention.
Figure 5:
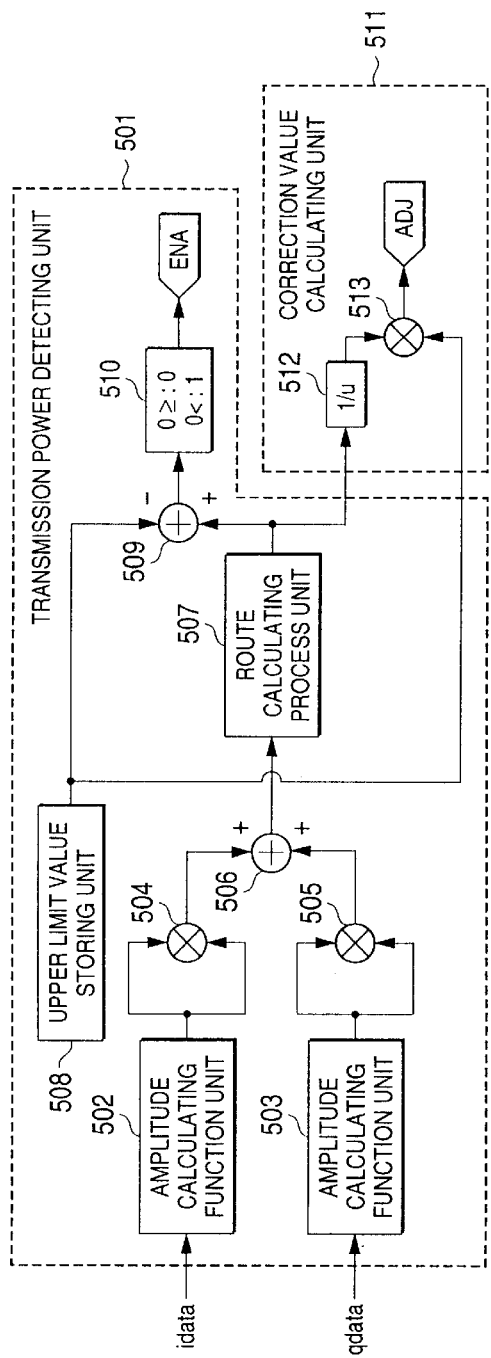
FIG. 5 is a block diagram for indicating an amplitude calculating function, a transmission power detecting unit, and a correction value calculating unit, and an application range unit of the filter according to the second embodiment.
Figure 6:
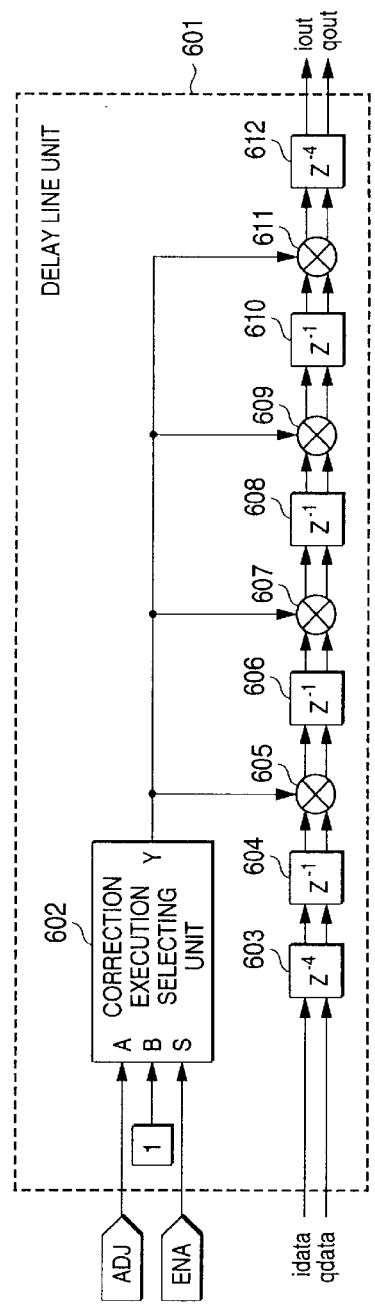
FIG. 6 is a block diagram for representing a delay line unit equipped with a correction value multiplying function, and an application range selecting function of the filter according to the second embodiment.

Referring now to FIG. 4 to FIG. 6, a description will be made of a transmission band limiting filter apparatus equipped with a peak amplitude suppressing function, according to a second embodiment mode of the present invention. In the above-explained filter apparatus of the first embodiment mode, the correction value detecting unit detects the application range. In this second embodiment mode, a correction value calculating unit 402 performs only a calculation of a correction value, and a delay line unit 403 judges as to whether or not a correction process operation is carried out for stored data based upon an enable signal issued from a power detecting unit 401. In FIG. 4, transmission data which are entered from an input terminal "$i_{data}$" and another input terminal "$q_{data}$" are entered into a transmission power detecting unit 401 equipped with an amplitude calculating function. The output of the transmission power detecting unit 401 is connected to both the correction value calculating unit 402 and the delay line unit 403. The output of the correction value calculating unit 402 is connected to the delay line unit 403. The output of the delay line unit 403 is connected to an n-times oversampling ROF unit 404.

Next, a description will now be made of functions owned by this transmission band limiting filter apparatus equipped with the peak amplitude suppressing function according to this second embodiment mode. As indicated in FIG. 4, in this filter apparatus, the transmission data which are entered from the input terminal "$i_{data}$" and the input terminal "$q_{data}$" are entered into the transmission power detecting unit 401. The transmission power detecting unit 401 previously calculates a transmission amplitude and transmission power when transmission data is transmitted, and then compares this calculated transmission power with a previously set upper limit value of the transmission power so as to detect an instantaneous peak. When the transmission power exceeds this upper limit value, the transmission power detecting unit 401 outputs an enable signal at this time instant. The correction value calculating unit 402 calculates an amplitude correction value based upon both the transmission power of the transmission data and the upper limit value of the transmission power, which are entered from the transmission power detecting unit 401, to thereby output the calculated amplitude correction value.

Also, the delay line unit 403 equipped with the correction value multiplying function owns a function capable of holding transmission data which is used to detect the transmission power in the transmission power detecting unit 401, and saves the transmission data entered from the input terminal "$i_{data}$" and the input terminal "$q_{data}$" into a delay line thereof. Next, in synchronism with the enable signal outputted from the transmission power detecting unit 401, the delay line unit 403 multiplies the transmission data saved in the delay line by the amplitude correction value outputted from the correction value calculating unit 402 so as to correct the amplitude of the transmission data, and then outputs the amplitude-corrected transmission data. The n-times oversampling ROF unit 404 is arranged in such a manner that a transmission band limiting process operation is carried out with respect to such transmission data which is outputted from the delay line unit 403 and partially amplitude-corrected, and then the band-limited transmission data are outputted from the output terminal "$i_{out}$" and the output terminal "$q_{out}$."

Next, the transmission power detecting unit 401 and the correction value calculating unit 402 will now be explained. A transmission power detecting unit 501 equipped with both an amplitude calculating function and a transmission power detecting function is arranged as shown in FIG. 5. The transmission power detecting unit 501 performs a band limiting process operation with respect to the transmission amplitudes of the transmission data entered from the input terminals "$i_{data}$" and "$q_{data}$" by using an amplitude calculating function unit 502 and an amplitude calculating function unit 503. The transmission power detecting unit 501 calculates instantaneous electric power by employing a multiplier 504, another multiplier 505, an adder 506, and a route circuit 507 based upon the respective transmission data after being band-limiting-processed. Then, an enable signal is produced by an adding/subtracting device 509 and an enable control unit 510, which are provided in this transmission power detecting unit 501. The adding/subtracting device 509 performs an adding/subtracting process operation between the output of the route circuit 507 and an upper limit value of transmission power, which is externally settable and is stored in an upper limit value storing unit 508. The enable control unit 510 owns the following logic idea. That is to say, in the case that the instantaneous power exceeds the preset upper limit value of the transmission power, the amplitude correction is carried out based on the adding/subtracting result of the adding/subtracting device 509, whereas when the instantaneous power does not exceed the upper limit value, the amplitude correction is not carried out. Furthermore, the instantaneous power corresponding to the output of the route circuit 507 is entered into a correction value calculating unit 511. In the correction value calculating unit 511, while the entered instantaneous power is employed, a correction value is produced by a reciprocal calculating processor 512 and a multiplier 513. The multiplier 513 multiplies the calculation result of the reciprocal calculating process unit 512 and the set transmission power by the upper limit value, so that a correction value is produced.

Next, the operation of the above-explained delay line unit 403 will now be explained more in detail with reference to FIG. 6. In a delay line unit 601 equipped with a correction value multiplying function, the transmission data is actually multiplied by the correction value to execute the correction process operation. This correction process operation is controlled by an enable signal entered from an enable signal input terminal. The correction values entered from the correction value calculating units 402 are inputted into a correction execution selecting unit 602 via a correction value input terminal. In synchronism with timing of the enable signal entered from the enable signal input terminal, the correction execution selecting unit 602 selectively outputs conditions as to whether or not the correction value entered from the correction value input terminal is outputted.

The output of the correction execution selecting unit 602 is inputted to a multiplier 605, another multiplier 607, another multiplier 609, and also a further multiplier 611. Also, the transmission data entered from the input terminal "$i_{data}$" and the input terminal "$q_{data}$" are inputted into a delay device 603. The output of this delay device 603 is entered into another delay device 604. The transmission data entered from the delay device 604 is correction-processed by multiplying the held transmission data by the correction value entered from the correction execution selecting unit 602 in the multiplier 605. Subsequently, the transmission data outputted from the multiplier 605 is entered to a delay device 606 provided at the post stage so as to be delay-processed. The transmission data entered from the delay device 606 is correction-processed by multiplying the held transmission data by the correction value entered from the correction execution selecting unit 602 in the multiplier 607. Subsequently, the transmission data outputted from the multiplier 607 is entered to a delay device 608 provided at the post stage so as to be delay-processed. The transmission data entered from the delay device 608 is correction-processed by multiplying the held transmission data by the correction value entered from the correction execution selecting unit 602 in the multiplier 609. Subsequently, the transmission data outputted from the multiplier 609 is entered to a delay device 610 provided at the post stage so as to be delay-processed. The transmission data entered from the delay device 610 is correction-processed by multiplying the held transmission data by the correction value entered from the correction execution selecting unit 602 in the multiplier 611. Subsequently, the transmission data outputted from the multiplier 611 is entered to a delay device 612 provided at the post stage so as to be delay-processed. The delay-processed transmission data is transferred via the output terminal "$i_{out}$" and the output terminal "$q_{out}$" to the n-times oversampling ROF unit 404 provided at the post stage in order to execute the band limiting process operation.

In the above-described embodiment mode 2, before the transmission data is entered to the n-times oversampling ROF unit 404, the correction process operation is carried out which can suppress the instantaneous peak produced by the n-times oversampling ROF unit 404. As a consequence, the transmission band limiting filter apparatus equipped with the peak amplitude suppressing function can reduce the instantaneous peak in the transmission power of the transmission signal, and can transmit the transmission signal having no distortion.

Embodiment Mode 3

Figure 7:
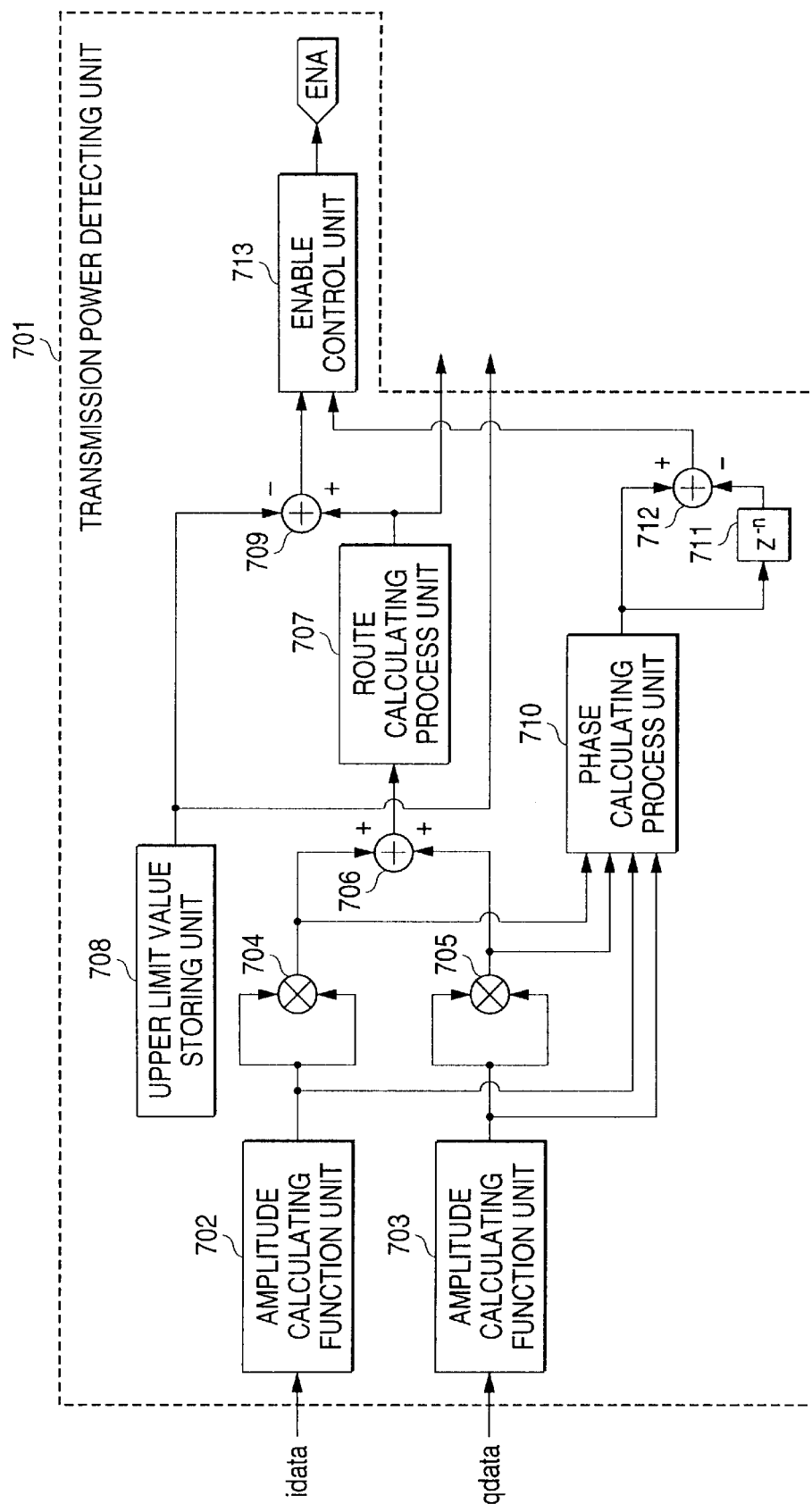
FIG. 7 is a block diagram for representing an amplitude calculating function, a phase changing amount, and a transmission power detecting unit of a filter according to a third embodiment mode of the present invention.

Next, a description will now be made of a transmission range limiting filter apparatus equipped with a peak amplitude suppressing function, according to a third embodiment mode of the present invention. This transmission band limiting filter apparatus equipped with the peak amplitude suppressing function is realized by that a function capable of calculating a phase changing amount is additionally provided with the transmission power detecting unit of the amplitude calculating device according to the first embodiment mode, and thus, such a transmission power detecting unit is newly arranged while being equipped with the amplitude calculating function, the phase changing amount calculating function, and also the transmission power calculating function. As indicated in FIG. 7, a transmission power detecting unit 701 equipped with the amplitude calculating function and the phase changing amount calculating function calculates the transmission amplitudes of the transmission data entered from the input terminals "$i_{data}$" and "$q_{data}$" by using an amplitude calculating function unit 702 and an amplitude calculating function unit 703. The transmission power detecting unit 701 calculates instantaneous electric power by employing a multiplier 704, another multiplier 705, an adder 706, and a route circuit 707. Next, this transmission power detecting unit 701 owns an adding/subtracting device 709 and the below-mentioned logic idea. The adding/subtracting device 709 performs such an adding/subtracting process operation between the output of the route circuit 707 and the upper limit value of the transmission power, which is externally settable and is stored in an upper limit value storing unit 708. The logic idea of this transmission power detecting unit 701 is defined as follows: In the case that the instantaneous power exceeds the preset upper limit value of the transmission power, the amplitude correction is carried out based upon the adding/subtracting result of the adding/subtracting device 709, whereas when the instantaneous power does not exceed the upper limit value, the amplitude correction is not carried out.

The transmission power detecting unit 701 is further constituted by a phase calculating unit 710, and a data holding unit 711. The phase calculating unit 710 performs an arc-tangent process operation for the transmission data based upon the output of the amplitude calculating function unit 702, the output of the amplitude calculating function unit 703, the output of the multiplier 704, and the output of the multiplier 705, so as to calculate an instantaneous phase. The data holding unit 711 holds the signal inputted from the phase calculating unit 710 during a set arbitrary time period. The signal of the data holding unit 711 is entered to the adding/subtracting device 712 in order to calculate a phase changing amount between two signals. The enable control unit 713 owns the below-mentioned logic idea, and produces the enable signal, while both the logic idea obtained by the instantaneous power and the logic idea obtained by the phase changing amount are entered thereinto. That is, when the phase changing amount obtained from the adding/subtracting device 712 exceeds a preset upper limit value of a phase rotation, the amplitude correction is carried out. To the contrary, when this phase changing amount is present within the upper limit value range, the amplitude correction is not performed. Then, an enable signal is produced by an enable control unit 713 of the transmission power calculating unit 701, into which the logic idea obtained by the instantaneous power and the logic idea obtained by the phase changing amount.

In accordance with the above-explained third embodiment mode, the phase changing amount between the transmission signals is added to the selection conditions for executing as to whether or not the amplitude correction is carried out in the first and second embodiment modes. As a result, a fine control can be carried out, and also the deteriorations of the transmission signal waveform which are caused by correcting the amplitude of the transmission data can be minimized.

Embodiment Mode 4

Figure 8:
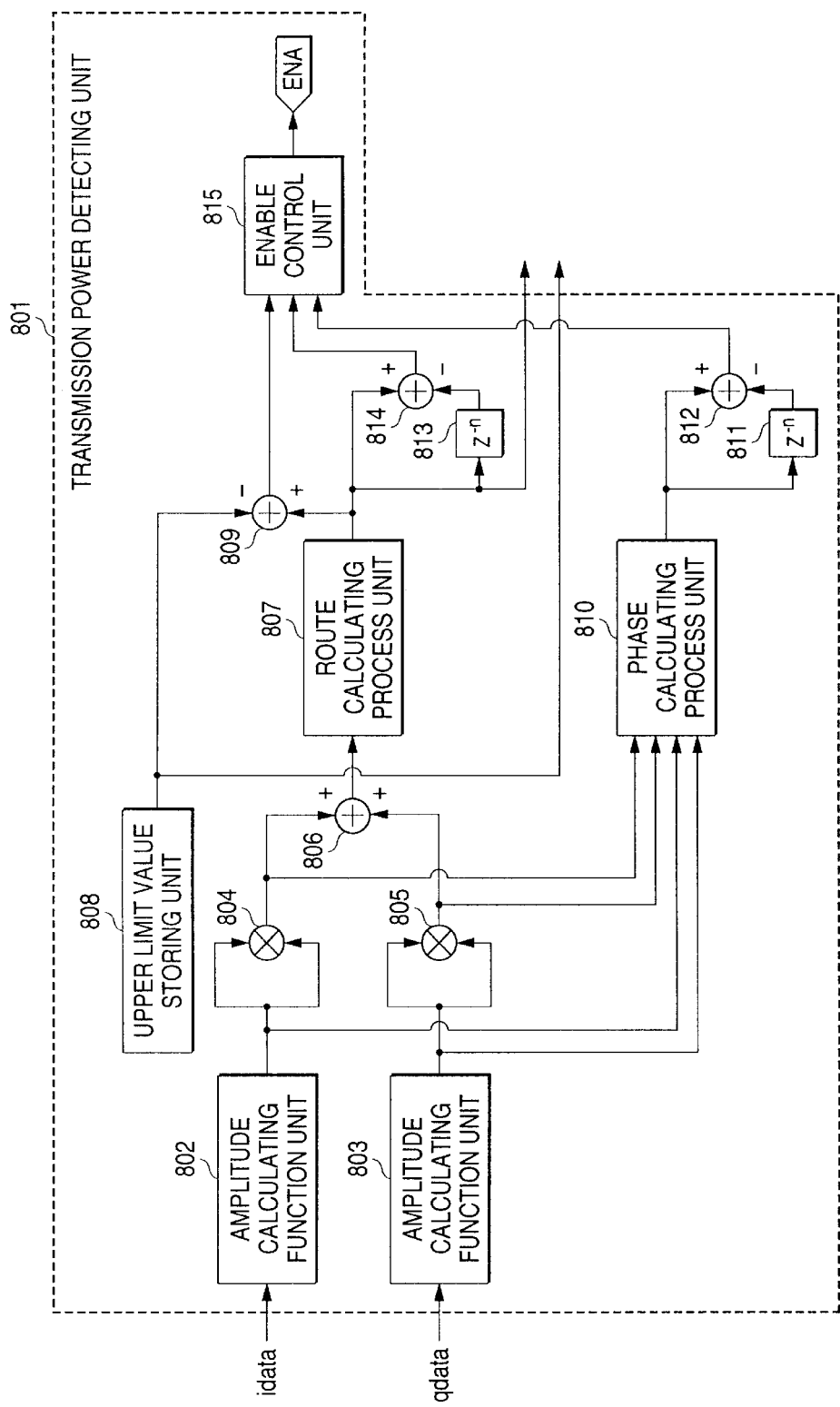
FIG. 8 is a block diagram for representing an amplitude calculating function, an amplitude changing amount, a phase changing amount, and a transmission power detecting unit of a filter according to a fourth embodiment mode of the present invention.

Next, a description will now be made of a transmission range limiting filter apparatus equipped with a peak amplitude suppressing function, according to a fourth embodiment mode of the present invention. This transmission band limiting filter apparatus equipped with the peak amplitude suppressing function is realized by that a function capable of detecting an amplitude changing amount is additionally provided with the transmission band limiting filter apparatus according to the third embodiment mode, and thus, such a transmission power detecting unit is featured, while being equipped with the amplitude calculating function, the amplitude changing amount, the phase changing amount detecting functions, and also the transmission power detecting function. As indicated in FIG. 8, a transmission power detecting unit 801 equipped with the amplitude calculating function and the amplitude changing amount, the phase changing amount, and also the transmission power detecting functions calculates the transmission amplitudes of the transmission data entered from the input terminals "$i_{data}$" and "$q_{data}$" by using an amplitude calculating function unit 802 and an amplitude calculating function unit 803. The transmission power detecting unit 801 calculates instantaneous electric power by employing a multiplier 804, another multiplier 805, an adder 806, and a route circuit 807. Next, this transmission power detecting unit 801 owns an adding/subtracting device 809 and the below-mentioned logic idea. The adding/subtracting device 809 performs such an adding/subtracting process operation between the output of the route circuit 807 and the upper limit value of the transmission power, which is externally settable and is stored in an upper limit value storing unit 808. The logic idea of this transmission power detecting unit 801 is defined as follows: In the case that the instantaneous power exceeds the preset upper limit value of the transmission power, the amplitude correction is carried out based upon the adding/subtracting result of the adding/subtracting device 809, whereas when the instantaneous power does not exceed the upper limit value, the amplitude correction is not carried out.

The transmission power detecting unit 801 is further constituted by a phase calculating unit 810, and a data holding function 811. The phase calculating unit 810 performs an arc-tangent process operation for the transmission data based upon the output of the amplitude calculating function unit 802, the output of the amplitude calculating function unit 803, the output of the multiplier 804, and the output of the multiplier 805, so as to calculate an instantaneous phase. The data holding function 811 holds the signal inputted from the phase calculating unit 810 during a arbitrary set time period. The output signal of the data holding function 811 and the signal inputted from the phase calculating device 810 are entered to an adding/subtracting device 812 in order to calculate a phase changing amount between two signals. The transmission power calculating unit 801 owns the below-mentioned logic idea. That is, when the phase changing amount obtained from the adding/subtracting device 812 exceeds a preset upper limit value of a phase rotation, the amplitude correction is carried out. To the contrary, when this phase changing amount is present within the upper limit value range, the amplitude correction is not performed.

Next, the transmission power detecting unit 801 is further constructed of a data holding function 813 for holding a signal inputted from the route circuit 807 for an arbitrarily set time period. Both the signal inputted from the route circuit 807 and the output signal of the data holding function 813 are entered into an adding/subtracting device 814 so as to calculate an amplitude changing amount between the two signals. That is, when the amplitude changing amount obtained from the adding/subtracting device 814 exceeds a preset upper limit value of a phase rotation, the amplitude correction is carried out. To the contrary, when this amplitude changing amount is present within the upper limit value range, the amplitude correction is not performed. Then, an enable signal is produced by an enable control unit 815 of the transmission power calculating unit 801, into which the logic idea obtained by the instantaneous power and the logic idea obtained by the phase changing amount, and further the logic idea obtained by the amplitude changing amount are entered.

In accordance with the above-explained fourth embodiment mode, the amplitude changing amount between the transmission signals is added to the selection conditions for executing as to whether or not the amplitude correction is carried out in the first to third embodiment modes. As a result, a fine control can be carried out, and also the deteriorations of the transmission signal waveform which are caused by correcting the amplitude of the transmission data can be minimized.

Embodiment Mode 5

Figure 9:
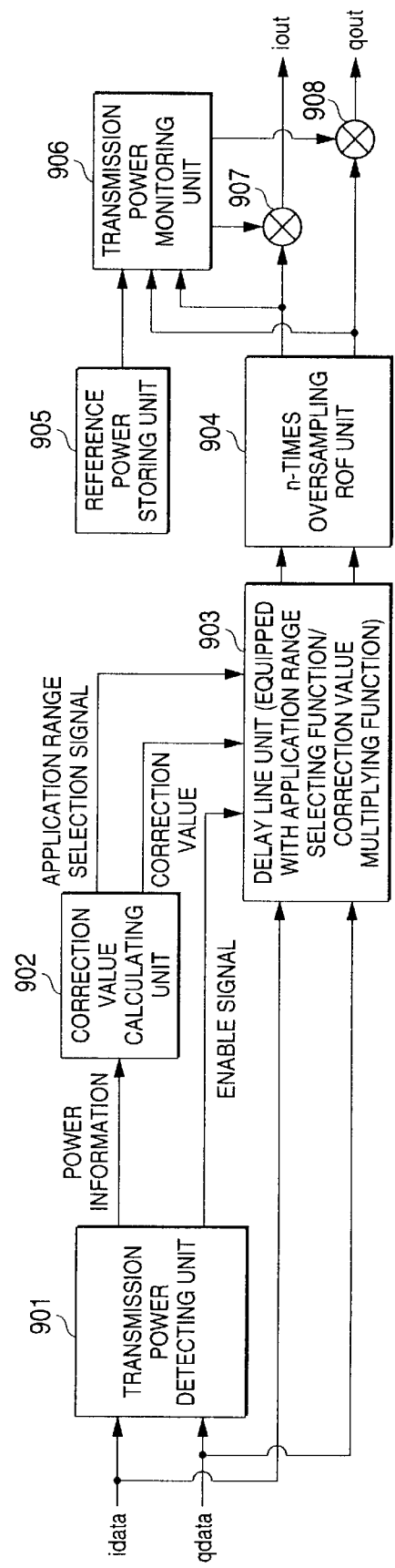
FIG. 9 is a block diagram for showing a transmission band limiting filter arrangement equipped with a transmission power monitoring function and a peak suppressing function according to a fifth embodiment mode of the present invention.

Next, a description will now be made of a transmission range limiting filter apparatus equipped with a peak amplitude suppressing function, according to a fifth embodiment mode of the present invention. This transmission band limiting filter apparatus equipped with the peak amplitude suppressing function is featured by that, as indicated in FIG. 9, a transmission power monitoring unit 906 is added to an output of an n-times oversampling ROF unit 904 in addition to the filter apparatus of the first embodiment mode. In FIG. 9, transmission data entered from an input terminal "$i_{data}$" and an input terminal "$q_{data}$" are inputted into a transmission power detecting unit 901 equipped with an amplitude calculating function and a transmission power calculating function. The output of the transmission power detecting unit 901 is connected to a correction value calculating unit 902 and a delay line unit 903, by which an actually applied application range is calculated and a correction value is calculated. The output of the correction value calculating unit 902 is connected to the delay line unit 903. The output of the delay line unit 903 is connected to the n-times oversampling ROF unit 904. Both an output of a reference power storing unit 905 and the output of the n-times oversampling ROF unit 904 are inputted into the transmission power monitoring unit 906. Both the output of the n-time oversampling ROF unit 904 and the output of the transmission power monitoring unit 906 are inputted into both a multiplier 907 and a multiplier 908.

Next, a description will now be made of a function of this transmission band limiting filter apparatus. In FIG. 9, the transmission data which are entered from the input terminal "$i_{data}$" and the input terminal "$q_{data}$" are entered into the transmission power detecting unit 901 equipped with both the amplitude calculating function and the transmission power calculating function. The transmission power detecting unit 901 previously calculates a transmission amplitude and transmission power when transmission data is transmitted, and then compares this calculated transmission power with a previously set upper limit value of the transmission power so as to detect an instantaneous peak.

Next, when the transmission power exceeds this upper limit value, the transmission power detecting unit 901 outputs an enable signal at this time instant. The correction value calculating unit 902 calculates an amplitude correction value based upon both the transmission power of the transmission data and the upper limit value of the transmission power, which are entered from the transmission power detecting unit 901, to thereby output the calculated amplitude correction value. At the same time, this correction value calculating unit 902 outputs an application range selection signal to which the above-described amplitude correction value is actually applied. The delay line unit 903 which is equipped with both an application range selecting function as well as a correction value multiplying function owns such a function capable of holding such transmission data which is used to detect the transmission power of the transmission data by the transmission power detecting unit 901, and saves the transmission data entered from the input terminals "$i_{data}$" and "$q_{data}$" into a delay line. Next, in synchronism with the enable signal entered from the transmission power detecting unit 901, the delay line unit 903 multiplies the amplitude correction value with respect to only the transmission data selected by using the application range selection signal entered from the correction value calculating unit 902 so as to correct the amplitude of the transmission data, and then outputs the amplitude-corrected transmission data. The n-times oversampling ROF unit 904 executes the transmission band limiting process operation with respect to the amplitude-corrected transmission data which is inputted from the delay line unit 903.

Next, both the output of the reference power storing unit 905 which stores thereinto the reference value of the transmission power, and the I-channel/Q-channel outputs of the n-times oversampling ROF unit 904 are entered into the transmission power monitoring unit 906. The transmission power monitoring unit 906 calculates a deterioration amount of the transmission power which is caused by suppressing the instantaneous peak, and also calculates gain correction data. The outputs of the transmission power monitoring unit 906 correspond to both the I-channel output and the Q-channel output of the n-times oversampling ROF unit 904, and are inputted into the respective multipliers 907 and 909. These multipliers 907 and 909 multiply the outputs of the transmission power monitoring unit 906 by the outputs of the n-times oversampling ROF unit 904, so that the deterioration amount of the transmission power which is caused by suppressing the instantaneous peak is corrected, and then the corrected transmission power is outputted from the output terminal "$i_{out}$" and the output terminal "$q_{out}$".

As previously described, in accordance with the transmission band limiting filter apparatus of this fifth embodiment mode, the transmission power amount which has been deteriorated by suppressing the instantaneous peak is detected with respect to the transmission power which is originally transmitted, and thus, the transmission power which is originally transmitted can be corrected.

Embodiment Mode 6

Next, a description will now be made of a transmission range limiting filter apparatus equipped with a peak amplitude suppressing function, according to a sixth embodiment mode of the present invention. This transmission band limiting filter apparatus equipped with the peak amplitude suppressing function is featured by that, as indicated in FIG. 10, a peak factor monitoring unit 1005 is added to an output of an n-times oversampling ROF unit 1004 in addition to the filter apparatus of the first embodiment mode. In FIG. 10, transmission data entered from an input terminal "$i_{data}$" and an input terminal "$q_{data}$" are inputted into a transmission power detecting unit 1001 equipped with an amplitude calculating function and a transmission power calculating function. The output of the transmission power detecting unit 1001 is connected to a correction value calculating unit 1002 and a delay line unit 1003, which is equipped with a function capable of calculating an application range and a correction value. The output of the correction value calculating unit 1002 is connected to the delay line unit 1003. The output of the delay line unit 1003 is connected to the n-times oversampling ROF unit 1004. The output of the n-times oversampling ROF unit 1004 is inputted into the peak factor monitoring unit 1005. The output of the peak factor monitoring unit 1005 is inputted into both the transmission power detecting unit 1001 and the correction value calculating unit 1002 in a feedback manner.

Next, a description will now be made of a function of this transmission band limiting filter apparatus. In FIG. 10, the transmission data which are entered from the input terminal "$i_{data}$" and the input terminal "$q_{data}$" are entered into the transmission power detecting unit 1001. The transmission power detecting unit 1001 previously calculates a transmission amplitude and transmission power when transmission data is transmitted, and then compares this calculated transmission power with a previously set upper limit value of the transmission power so as to detect an instantaneous peak. Next, when the transmission power exceeds this upper limit value, the transmission power detecting unit 1001 outputs an enable signal at this time instant. The correction value calculating unit 1002 calculates an amplitude correction value based upon both the transmission power of the transmission data and the upper limit value of the transmission power, which are entered from the transmission power detecting unit 1001, to thereby output the calculated amplitude correction value. At the same time, this correction value calculating unit 1002 outputs an application range selection signal to which the above-described amplitude correction value is actually applied.

Next, the delay line unit 1003 has such a function capable of saving the transmission data used to detect the transmission power in the transmission power detecting unit 1001 for the transmission data, and saves the transmission data entered from the input terminals "$i_{data}$" and "$q_{data}$" into a delay line unit. Next, in synchronism with the enable signal entered from the transmission power detecting unit 1001, the delay line unit 1003 multiplies the amplitude correction value with respect to only the transmission data selected by using the application range selection signal entered from the correction value calculating unit 1002 so as to correct the amplitude of the transmission data, and then outputs the amplitude-corrected transmission data. The n-times oversampling ROF unit 1004 executes the transmission band limiting process operation with respect to the amplitude-corrected transmission data which is inputted from the delay line unit 1003.

Next, the output of the n-times oversampling ROF unit 1004 is inputted into the peak factor monitoring unit 1005. The peak factor monitoring unit 1005 monitors as to whether or not a peak suppression setting operation is processed in accordance with the set manner. This peak suppression setting operation is set by considering performance of a transmission analog amplifier which is connected subsequent to the peak factor monitoring unit 1005. In the case that the peak suppression setting operation is processed in the improper manner, this peak factor monitoring unit 1005 feeds back both an upper value of an instantaneous peak suppression operation saved in the transmission power detecting unit 1001, and also a signal for changing an application range to the correction value calculating unit 1002. Also, the output of the n-times oversampling ROF unit 1004 is outputted via the output terminal "$i_{out}$" and the output terminal "$q_{out}$" to a post stage.

As previously described, in accordance with the transmission band limiting filter apparatus of this sixth embodiment mode, since the instantaneous peak is detected with respect to the transmission signal, the peak factor monitoring unit can confirm as to whether or not the detected peak value is corrected to the optimum instantaneous peak value with respect to the transmission amplifier connected at the post stage thereof. When the optimum instantaneous peak value is not properly set, the peak factor monitoring unit can perform the feedback control in such a manner that the instantaneous peak value is furthermore corrected.

Embodiment Mode 7

Next, a description will now be made of a transmission range limiting filter apparatus equipped with a peak amplitude suppressing function, according to a seventh embodiment mode of the present invention. This transmission band limiting filter apparatus equipped with the peak amplitude suppressing function is featured by that, as indicated in FIG. 11, a transmission power monitoring unit 1105 is added to an output of an n-times oversampling ROF unit 1104 in addition to the filter apparatus of the first embodiment mode. In FIG. 11, transmission data entered from an input terminal "$i_{data}$" and an input terminal "$q_{data}$" are inputted into a transmission power detecting unit 1101 equipped with an amplitude calculating function and a transmission power calculating function. The output of the transmission power detecting unit 1101 is connected to a correction value calculating unit 1102 and a delay line unit 1103. The correction value calculating unit 1102 is equipped with an application range and a correction value calculating function. The delay line unit 1103 is equipped with an application range selecting function and a correction value multiplying function. The output of the correction value calculating unit 1102 is connected to the delay line unit 1103. The output of the delay line unit 1103 is connected to then-times oversampling ROF unit 1104. The output of the n-times oversampling ROF unit 1104 is inputted into a transmission quality deterioration monitoring unit 1106. The output of the transmission quality deterioration monitoring unit 1105 is entered to both the transmission power detecting unit 1101 and the correction value calculating unit 1102 in the feedback manner.

Next, a description will now be made of a function of this transmission band limiting filter apparatus. In FIG. 11, the transmission data which are entered from the input terminal "$i_{data}$" and the input terminal "$q_{data}$" are entered into the transmission power detecting unit 1101. The transmission power detecting unit 1101 previously calculates a transmission amplitude and transmission power when transmission data is transmitted, and then compares this calculated transmission power with a previously set upper limit value of the transmission power so as to detect an instantaneous peak. Next, when the transmission power exceeds this upper limit value, the transmission power detecting unit 1101 outputs an enable signal at this time instant. The correction value calculating unit 1102 calculates an amplitude correction value based upon both the transmission power of the transmission data and the upper limit value of the transmission power, which are entered from the transmission power detecting unit 1101, to thereby output the calculated amplitude correction value. At the same time, this correction value calculating unit 1102 outputs an application range selection signal to which the above-described amplitude correction value is actually applied. The delay line unit 1103 owns such a function capable of holding such transmission data which is used to detect the transmission power of the transmission data by the transmission power detecting unit 1101, and saves the transmission data entered from the input terminals "$i_{data}$" and "$q_{data}$" into a delay line. Next, in synchronism with the enable signal entered from the transmission power detecting unit 1101, the delay line unit 1103 multiplies the amplitude correction value with respect to only the transmission data selected by using the application range selection signal entered from the correction value calculating unit 1102 so as to correct the amplitude of the transmission data, and then outputs the amplitude-corrected transmission data. The n-times oversampling ROF unit 1104 executes the transmission band limiting process operation with respect to the amplitude-corrected transmission data which is inputted from the delay line unit 1103.

Next, the output of the n-times oversampling ROF unit 1104 is inputted to the transmission quality monitoring unit 1105. The transmission quality monitoring unit 1105 monitors as to whether or not transmission waveform precision can be achieved by preset transmission waveform precision. This transmission waveform precision is set by considering a communication quality during reception operation. In the case that the transmission waveform precision is processed in the improper manner, this transmission quality monitoring unit 1105 feeds back both an upper value of an instantaneous peak suppression operation saved in the transmission power detecting unit 1101, and also a signal for changing an application range to the correction value calculating unit 1102. Also, the output of the n-times oversampling ROF unit 1104 is outputted via the output terminal "$i_{out}$" and the output terminal "$q_{out}$" to a post stage.

As previously explained, in accordance with the transmission band limiting filter apparatus of this seventh embodiment mode, since the deterioration of the transmission quality is detected from the transmission signal, the transmission quality monitoring unit 1105 can confirm as to whether or not the quality of the transmission signal is deteriorated by executing the instantaneous peak suppressing process operation. When the transmission quality monitoring unit 1105 confirms the deterioration of the transmission quality, this transmission quality monitoring unit 1105 can perform the feedback control operation in such a manner that the correction amount of the instantaneous peak suppressing operation can be properly corrected.

Embodiment Mode 8

An apparatus according to an eighth embodiment mode of the present invention is a transmission apparatus operated in the CDMA system using the spread spectrum system, while employing a transmission band limiting filter apparatus equipped with a peak amplitude suppressing function. That is, as represented in FIG. 12, the transmission apparatus according to the eighth embodiment mode is arranged by employing all of a transmission power monitoring unit 1211, a peak factor monitoring unit 1208, and a transmission quality deterioration monitoring unit 1209, as explained with respect to the fifth embodiment mode through the seventh embodiment mode.

Figure 12:
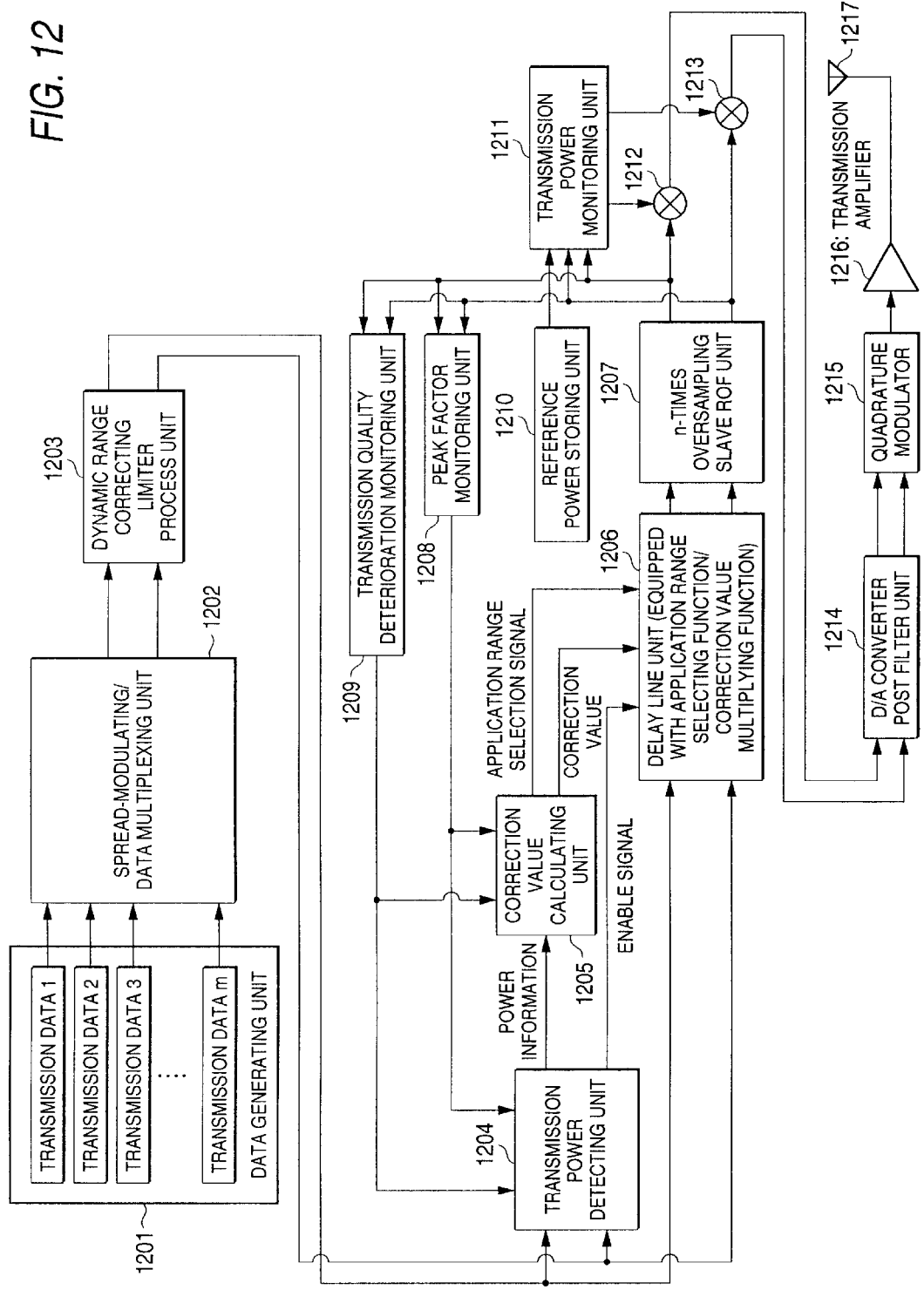
FIG. 12 is a block diagram for indicating a transmission apparatus and a transmission band limiting filter apparatus equipped with a peak amplitude function, which are used in the CDMA system, according to an eighth embodiment mode of the present invention.

This transmission apparatus, shown in FIG. 12, is arranged by employing a data generating unit 1201 of generating transmission data "1" through transmission data "m", and a spread-modulating/data multiplexing unit 1202 for executing both a spread modulating process operation for each of the transmission data series generated from the data generating unit 1201, and a multiplexing operation among the respective transmission data. With respect to a signal amplitude of transmission data which has been multiplexed, a dynamic range correcting limiter 1203 performs a correction process operation of actually transmitted data. Next, the transmission data which has been correction-processed is entered into a transmission power detecting unit 1204 equipped with both a amplitude calculating function and a transmission power calculating function. The transmission power detecting unit 1204 previously calculates a transmission amplitude and transmission power when transmission data is transmitted, and then compares this calculated transmission power with a previously set upper limit value of the transmission power so as to detect an instantaneous peak.

Next, when the transmission power exceeds this upper limit value, the transmission power detecting unit 1204 outputs an enable signal at this time instant. A correction value calculating unit 1205 for calculating an application range to which a correction value is actually applied and also for calculating a correction value within this application range, calculates an amplitude correction value based upon both the transmission power of the transmission data and the upper limit value of the transmission power, which are entered from a transmission power detecting unit 1204, to thereby output the calculated amplitude correction value. At the same time, this correction value calculating unit 1205 outputs an application range selection signal to which the above-described amplitude correction value is actually applied. A delay line unit 1206 owns such a function capable of holding such transmission data which is used to detect the transmission power of the transmission data by the transmission power detecting unit 1204, and saves the transmission data entered from the dynamic range correcting limiter 1203 into a delay line.

Next, in synchronism with the enable signal entered from the transmission power detecting unit 1204, the delay line unit 1206 multiplies the amplitude correction value with respect to only the transmission data selected by using the application range selection signal entered from the correction value calculating unit 1205 so as to correct the amplitude of the transmission data, and then outputs the amplitude-corrected transmission data. An n-times oversampling ROF unit 1207 executes the transmission band limiting process operation with respect to the amplitude-corrected transmission data which is inputted from the delay line unit 1206.

Next, the output of the n-times oversampling ROF unit 1207 is inputted into the peak factor monitoring unit 1208. The peak factor monitoring unit 1208 monitors as to whether or not a peak suppression setting operation is processed in accordance with the set manner. This peak suppression setting operation is set by considering performance of a transmission analog amplifier which is connected subsequent to the peak factor monitoring unit 1208. In the case that the peak suppression setting operation is processed in the improper manner, this peak factor monitoring unit 1208 feeds back both an upper value of an instantaneous peak suppression operation saved in the transmission power detecting unit 1204, and also a signal for changing an application range to the correction value calculating unit 1205.

Next, the output of the n-time oversampling ROF unit 1207 is inputted to the transmission quality monitoring unit 1209. The transmission quality monitoring unit 1209 monitors as to whether or not transmission waveform precision can be achieved by preset transmission waveform precision. This transmission waveform precision is set by considering a communication quality during reception operation. In the case that the transmission waveform precision is processed in the improper manner, this transmission quality monitoring unit 1209 feeds back both an upper value of an instantaneous peak suppression operation saved in the transmission power detecting unit 1204, and also a signal for changing an application range to the correction value calculating unit 1205.

Next, the n-times oversampling ROF unit 1207 performs the transmission band limiting process operation with respect to the transmission data which is partially amplitude-corrected in response to the enable signal outputted from the delay line unit 1206. Both an output of a reference power storing unit 1210 which stores thereinto the reference value of the present transmission power, and the I-channel/Q-channel outputs of the n-times oversampling ROF unit 1207 are entered into the transmission power monitoring unit 1211. The transmission power monitoring unit 1211 calculates a deterioration amount of the transmission power which is caused by suppressing the instantaneous peak, and also calculates gain correction data. The outputs of the transmission power monitoring unit 1211 correspond to both the I-channel output and the Q-channel output of the n-times oversampling ROF unit 1207, and are inputted into the respective multipliers 1212 and 1213. These multipliers 1212 and 1213 multiply the outputs of the transmission power monitoring unit 1211 by the outputs of the n-times oversampling ROF unit 1207, so that the deterioration amount of the transmission power which is caused by suppressing the instantaneous peak is corrected. The transmission data which is corrected by the multiplier 1212 and the multiplier 1213 is entered into a D/A converter and a post filter 1214, which correspond to an analog baseband processing unit. Thus, the digital-to-analog signal conversion is carried out, and also, the folding data portion is removed. Then, a quadrature modulator (wireless signal processing unit) 1215 quadrature-modulates the transmission data which is processed by the D/A converter as well as the post filter 1214 with respect to the I-channel and the Q-channel to thereby output the quadrature-modulated transmission data. The analog transmission signal processed by the quadrature modulator 1215 is amplified by an analog transmission amplifier 1216, and thereafter, the amplified transmission signal is transmitted via an antenna 1217 in the form of electromagnetic waves.

As previously described, in accordance with the transmission band limiting filter apparatus equipped with the peak amplitude suppressing function of the present invention and the transmission apparatus of the present invention, the transmission data which may give the most significant adverse influence to the generation of the peak value is specified based upon the peak value, the phase changing amount, or the amplitude changing amount, detected by the transmission power detecting unit, or based upon a combination of these detected factors, so that only the specific amplitude component of such transmission data before being entered into the transmission band limiting filter is corrected. As a consequence, only the instantaneous peak power can be reduced without producing any of the frequency distortions caused by suppressing the transmission data over the transmission data frequency characteristic. Also, the input dynamic range of the D/A converter connected at the post stage can be optimized, and furthermore, the requirements for the calculation linearity with respect to the wireless signal unit and the analog transmission amplifier, which are constructed of the analog electronic elements, can be relaxed, so that these filter apparatus and transmission apparatus can be operated by low power consumption and in high efficiencies. In addition to the above-described effects of the present invention, in such a wireless communication system of the CDMA system using the spread spectrum system where the transmission data are handled in the multiplexing environment, another effect can be achieved. That is to say, the base station system and the high performance portable units employing the code multiplexing technique can be made compact and also in low cost.

What is claimed is:

1. A transmission band limiting filter apparatus equipped with a peak amplitude suppressing function, for performing a transmission band limiting process operation of transmission data including I-channel transmission data and Q-channel transmission data which is intersected orthogonal to the I-channel transmission data, comprising:

a transmission amplitude calculating unit for calculating a transmission amplitude and transmission power of each of said I-channel transmission data and said Q-channel transmission data intersected orthogonal to said I-channel transmission data;

a transmission power detecting unit for detecting an instantaneous peak value by comparing said transmission power with a preset upper limit value in such a manner that when said transmission power exceeds said upper limit value, said instantaneous peak value appears;

an application range calculating unit for determining an application range of a correction based upon the detection information of said instantaneous peak value detected by said transmission power detecting unit;

a correction value calculating unit for determining an amplitude correction value of said transmission amplitude based on the detection information of said instantaneous peak value;

an enable signal produced by said transmission power detecting unit based upon the appearing timing information of said instantaneous peak value;

a first delay line equipped with a correction value function, constituted by a delay line having a correcting unit, for holding both said amplitude correction value supplied from said correction value calculating unit and said transmission data from which said instantaneous peak value is detected, and for performing the correction in response to said enable signal, said correcting unit correcting said held transmission data based on said amplitude correction value; and a transmission band limiting filter for executing a band limiting process operation of said transmission data after bing corrected, which is obtained from said first delay line equipped with the correction value function.

2. The transmission band limiting filter apparatus equipped with a peak amplitude suppressing function as claimed in claim 1 wherein:

said transmission amplitude calculating unit comprises an electric power calculating unit for calculating an instantaneous transmission power based on the output of said transmission amplitude calculating unit, and said transmission power detecting unit, which owns a data saving function capable of externally setting arbitrary numeral data, including:

an upper limit value storing apparatus for storing thereinto a power upper limit value;

a transmission power comparing unit for comparing said instantaneous transmission power obtained by said electric power calculating unit with said power upper limit value stored in said upper limit value storing apparatus; and a signal converting unit for converting a comparison result obtained by said transmission power comparing unit into the enable signal.

3. The transmission band limiting filter apparatus equipped with a peak amplitude suppressing function as claimed in claim 1 wherein:

said correction value calculating unit includes:

a calculating unit for calculating a reciprocal of said instantaneous peak value entered from said transmission power detecting unit; and a multiplying unit for multiplying a power upper limit value stored in an upper limit storing function by said calculated reciprocal of the instantaneous peak value.

4. The transmission band limiting filter apparatus equipped with a peak amplitude suppressing function as claimed in claim 3 wherein:

said application range calculating unit is arranged in such a manner that the correction application range with respect to said transmission data is selected based upon a numeral value entered from said multiplying unit.

5. The transmission band limiting filter apparatus equipped with a peak amplitude suppressing function as claimed in claim 1 wherein:

said first delay line equipped with the correction value function includes:

a first selecting unit for selectively switching conditions as to whether or not the transmission data is corrected in correspondence with a numeral value entered from said correction value calculating unit based upon said enable signal entered from said transmission power detecting unit;

a second selecting unit for selectively switching conditions as to whether or not each of the I-channel transmission data and the Q-channel transmission data are separately corrected in response to an application range selection signal entered from said correction value calculating unit;

a second delay line constructed of a data saving function capable of saving said transmission data which is used to detect said instantaneous peak value by said transmission power detecting unit; and a multiplying unit arranged between said data saving function for constituting said second delay line and said data saving function for separately multiplying the outputs of said first and second selecting units by said transmission data stored in said data saving function.

6. The transmission band limiting filter apparatus equipped with a peak amplitude suppressing function as claimed in claim 1 wherein:

said first delay line is arranged by that said transmission data from which said instantaneous peak value has been detected is held, and a multiplication with said amplitude correction value is performed only for a portion of said transmission data which constitutes the subject of said application range.

7. The transmission band limiting filter apparatus equipped with a peak amplitude suppressing function as claimed in claim 1 wherein:

said first delay line includes:

a selecting unit for selectively switching conditions as to whether or not the transmission data is corrected in correspondence with the correction value entered from said correction value calculating unit based upon said enable signal entered from said transmission power detecting unit and also said transmission amplitude calculating unit;

a second delay line constructed of a data saving function capable of saving said transmission data which is used to detect said instantaneous peak value by said transmission power detecting unit and said transmission amplitude calculating unit; and a multiplying unit arranged between said data saving function for constituting said second delay line and said data saving function for separately multiplying an output of said selecting unit by said transmission data stored in said data saving function.

8. The transmission band limiting filter apparatus equipped with a peak amplitude suppressing function as claimed in claim 1 wherein:

said transmission amplitude calculating unit and said transmission power detecting unit comprise:

a signal phase changing amount calculating unit for calculating phase changing amount of an arbitrarily settable signal section based upon an output of said transmission amplitude calculating unit; and a converting unit for converting a comparison result between said phase changing amount detected by said signal phase changing amount calculating unit and a transmission power comparing function into the enable signal.

9. The transmission band limiting filter apparatus equipped with a peak amplitude suppressing function as claimed in claim 1 wherein:

said transmission amplitude calculating unit and said transmission power detecting unit comprise:

a signal phase changing amount calculating unit for calculating a phase changing amount of an arbitrarily settable signal section based upon an output of said transmission amplitude calculating unit;

a signal amplitude changing amount detecting unit for detecting an amplitude changing amount of an arbitrarily settable signal section based upon the output of said transmission amplitude calculating unit; and a converting unit for converting a comparison result between said phase changing amount detected by said signal phase changing amount calculating unit and a transmission power comparing function into the enable signal.

10. The transmission band limiting filter apparatus equipped with a peak amplitude suppressing function as claimed in claim 1, further comprising:

a transmission power monitoring unit for monitoring a power difference between a move averaged transmission power of said transmission data processed by said transmission band limiting filter and a set referenced power, and for calculating a power adjusting value based upon the monitored power difference; and a multiplying function unit for multiplying the move averaged transmission power of said transmission data processed by said transmission band limiting filter by said power adjusting value entered from said transmission power monitoring unit.

11. The transmission band limiting filter apparatus equipped with a peak amplitude suppressing function as claimed in claim 1, further comprising:

another transmission power detecting unit for calculating the instantaneous peak value based upon both a move averaged transmission power said transmission data processed by said transmission band limiting filter and an instantaneous transmission power, for calculating a peak difference between said calculated instantaneous peak value and a set reference instantaneous peak value and for performing a transmission amplitude calculation and the transmission powers in such a manner that the instantaneous peak value, which is optimized with respect to a transmission analog amplifier connected subsequent to said transmission power detecting unit, is reset; and an instantaneous peak value monitoring unit for executing a feedback control with respect to said correction value calculating unit.

12. The transmission band limiting filter apparatus equipped with a peak amplitude suppressing function as claimed in claim 1, further comprising:

a transmission quality deterioration monitoring unit for calculating a waveform error on a time axis between a waveform shape of said transmission data processed by said transmission band limiting filter and a shape of a set reference transmission waveform; and for feedback-controlling both said transmission power detecting unit and said correction value calculating unit in order that the waveform error within a transmission quality deterioration characteristic which is allowable within performance is obtained with respect to a receiver for receiving a transmitted data.

* * * * *